(12) United States Patent
Knickrehm et al.

(10) Patent No.: US 12,116,843 B2
(45) Date of Patent: Oct. 15, 2024

(54) ROPE JOINING

(71) Applicant: SafeWorks, LLC, Tukwila, WA (US)

(72) Inventors: Morgan Knickrehm, Kalispell, MT (US); Gregory Vincent Crew, Seattle, WA (US)

(73) Assignee: SafeWorks, LLC, Atlanta, GA (US)

( * ) Notice: Subject to any disclaimer, the term of this patent is extended or adjusted under 35 U.S.C. 154(b) by 907 days.

(21) Appl. No.: 16/931,162

(22) Filed: Jul. 16, 2020

(65) Prior Publication Data

US 2020/0347675 A1  Nov. 5, 2020

Related U.S. Application Data

(63) Continuation of application No. 16/513,623, filed on Jul. 16, 2019, which is a continuation-in-part of (Continued)

(51) Int. Cl.
  *E06C 7/18*  (2006.01)
  *A62B 35/00*  (2006.01)

(52) U.S. Cl.
  CPC ............ *E06C 7/186* (2013.01); *A62B 35/005* (2013.01); *A62B 35/0081* (2013.01)

(58) Field of Classification Search
  CPC ..... E06C 7/186; A62B 35/00; A62B 35/0081; A62B 35/0056; F16G 11/00; F16G 11/02; F16G 11/08; F16G 11/03
  (Continued)

(56) References Cited

U.S. PATENT DOCUMENTS

| 979,567 A | * | 12/1910 | Rosenthal | ............... F16H 55/36 474/167 |
| 2,434,358 A | | 1/1948 | Louis | |

(Continued)

FOREIGN PATENT DOCUMENTS

| CN | 2602216 Y | 2/2004 |
| CN | 101871507 A | 10/2010 |

(Continued)

OTHER PUBLICATIONS

European Patent Application No. 18836051.5; Extended Search Report; dated Mar. 9, 2021; 7 pages.
(Continued)

*Primary Examiner* — Daniel P Cahn
*Assistant Examiner* — Shiref M Mekhaeil
(74) *Attorney, Agent, or Firm* — Foley & Lardner LLP

(57) ABSTRACT

Integrated climb assist and fall arrest system and methods to assist users climbing ladders and vertical paths are disclosed. The integrated systems and comprise a controller connected to a user's harness, a static fall arrest cable, and a movable climb assist belt. The connection of the fall arrest components and the climb assist components may include physical connection, electronic connection, communication, or any combination thereof. The climb assist belt can be driven by a motor to provide an upwards climb assistance force to a user along a vertical path. The motor can be dynamically adjusted to continuously provide a level of climb assistance. The integrated controller is also configured to mechanically detect downwards movement and engage an overspeed braking mechanism when a threshold velocity or acceleration is detected.

12 Claims, 21 Drawing Sheets

Related U.S. Application Data application No. 16/135,781, filed on Sep. 19, 2018, now Pat. No. 10,781,885, and a continuation-in-part of application No. 16/037,793, filed on Jul. 17, 2018.

(60) Provisional application No. 62/560,925, filed on Sep. 20, 2017, provisional application No. 62/533,600, filed on Jul. 17, 2017.

(58) Field of Classification Search
USPC .......................................................... 182/3
See application file for complete search history.

(56) References Cited

U.S. PATENT DOCUMENTS

| | | | |
|---|---|---|---|
| 2,456,182 A * | 12/1948 | Goble ..................... | F21V 21/29 |
| | | | 403/56 |
| 2,546,202 A | 3/1951 | Trouin | |
| 2,596,513 A | 5/1952 | Tocci-Guilbert | |
| 2,607,094 A * | 8/1952 | Nicosia ................. | B65H 69/00 |
| | | | 403/310 |
| 2,681,781 A | 6/1954 | Loyal | |
| 2,693,216 A * | 11/1954 | Broske ................... | H01R 4/20 |
| | | | 29/863 |
| 2,865,978 A * | 12/1958 | Modrey .................. | H01B 7/06 |
| | | | 338/214 |
| 2,931,466 A | 4/1960 | Allenbaugh | |
| 2,990,131 A | 6/1961 | Carlsson | |
| 3,033,600 A * | 5/1962 | Drysdale ................ | B21F 15/06 |
| | | | 174/94 R |
| 3,136,844 A | 6/1964 | Petersen | |
| 3,177,543 A | 4/1965 | Fountain | |
| 3,183,658 A | 5/1965 | Drinko et al. | |
| 3,237,719 A * | 3/1966 | Russell ..................... | E06C 1/12 |
| | | | 182/103 |
| 3,287,778 A | 11/1966 | Cannizzaro | |
| 3,402,788 A * | 9/1968 | Redman .................... | E06C 1/12 |
| | | | 182/207 |
| 3,492,702 A | 2/1970 | Stafford | |
| 3,825,356 A * | 7/1974 | Crook, Jr. ............... | F16G 11/02 |
| | | | 403/404 |
| 3,852,943 A | 12/1974 | Healy | |
| 3,879,016 A | 4/1975 | Kankkunen | |
| 3,908,791 A | 9/1975 | Kleine et al. | |
| 4,059,871 A | 11/1977 | Swager | |
| 4,071,926 A | 2/1978 | Sweet et al. | |
| 4,077,094 A | 3/1978 | Swager | |
| RE30,072 E | 8/1979 | Kleine et al. | |
| 4,183,692 A * | 1/1980 | Durr ....................... | F16G 11/02 |
| | | | 403/275 |
| 4,252,214 A | 2/1981 | Miller | |
| 4,368,910 A | 1/1983 | Fidrych | |
| 4,533,026 A | 8/1985 | Bernard | |
| 4,542,884 A | 9/1985 | Dodge | |
| 4,580,658 A | 4/1986 | Brda | |
| 4,638,919 A | 1/1987 | Feenick | |
| 4,657,110 A | 4/1987 | Wolner | |
| 4,846,075 A | 7/1989 | Tupper | |
| 4,878,270 A | 11/1989 | Westerkamp | |
| 4,923,037 A | 5/1990 | Stephenson et al. | |
| 4,938,435 A | 7/1990 | Varner et al. | |
| 5,156,240 A | 10/1992 | Ostrobrod | |
| 5,186,289 A | 2/1993 | Wolner et al. | |
| 5,265,696 A | 11/1993 | Casebolt | |
| 5,287,950 A | 2/1994 | Feathers et al. | |
| 5,323,873 A | 6/1994 | Pelofi | |
| 5,351,906 A | 10/1994 | Feathers | |
| 5,722,612 A | 3/1998 | Feathers | |
| 5,762,282 A | 6/1998 | Wolner | |
| 5,799,753 A | 9/1998 | Peltier | |
| 5,934,408 A | 8/1999 | Flux | |
| 6,146,049 A | 11/2000 | Faris | |
| 6,161,647 A | 12/2000 | Braden et al. | |
| 6,213,675 B1 * | 4/2001 | Ungruh ................ | F16C 11/0633 |
| | | | 29/898.047 |
| 6,793,046 B2 | 9/2004 | Petzl et al. | |
| 6,814,185 B1 | 11/2004 | Ostrobrod | |
| 6,814,523 B1 * | 11/2004 | Nilsson .................. | F16G 11/08 |
| | | | 403/312 |
| 6,837,337 B2 | 1/2005 | Thomas et al. | |
| 7,137,481 B2 | 11/2006 | Petzl et al. | |
| 7,370,725 B1 | 5/2008 | Dornfeld | |
| 7,845,669 B2 | 12/2010 | Yeh et al. | |
| 7,987,945 B2 | 8/2011 | Petersen | |
| 8,141,681 B2 | 3/2012 | Bricknell et al. | |
| 8,348,016 B2 | 1/2013 | Wolf et al. | |
| 8,757,324 B2 | 6/2014 | Renton et al. | |
| 8,887,865 B2 | 11/2014 | Matharu | |
| 8,997,928 B1 * | 4/2015 | Ellis ..................... | A62B 35/005 |
| | | | 182/36 |
| 9,016,432 B2 | 4/2015 | Hartman et al. | |
| 9,132,297 B2 | 9/2015 | Casebolt et al. | |
| 9,168,402 B2 | 10/2015 | Casebolt et al. | |
| 9,267,571 B2 * | 2/2016 | Stephenson ............. | F16G 11/08 |
| 9,623,269 B2 | 4/2017 | Oddou et al. | |
| 9,822,586 B2 | 11/2017 | Patron et al. | |
| 10,027,097 B1 * | 7/2018 | Jordan ................. | G02B 6/4465 |
| 10,036,202 B2 | 7/2018 | Bornack | |
| 10,612,709 B2 | 4/2020 | Bruehler et al. | |
| 10,619,417 B2 | 4/2020 | Ostrobrod | |
| 10,760,336 B2 | 9/2020 | Hwang | |
| 11,065,477 B2 | 7/2021 | Ratalino | |
| 11,420,849 B2 | 8/2022 | Liu et al. | |
| 11,759,662 B2 | 9/2023 | Schrank | |
| 2004/0020727 A1 | 2/2004 | Petzl et al. | |
| 2004/0235619 A1 | 11/2004 | Stoltz | |
| 2005/0051659 A1 | 3/2005 | Wolner et al. | |
| 2005/0082115 A1 | 4/2005 | Petzl et al. | |
| 2005/0191910 A1 | 9/2005 | Bertini et al. | |
| 2006/0113147 A1 | 6/2006 | Harris | |
| 2007/0045045 A1 | 3/2007 | Deuer | |
| 2007/0127852 A1 * | 6/2007 | Town ................. | B65D 88/1618 |
| | | | 383/18 |
| 2007/0158137 A1 | 7/2007 | Petersen | |
| 2007/0175698 A1 | 8/2007 | Ketring | |
| 2008/0203370 A1 | 8/2008 | Ball et al. | |
| 2009/0249712 A1 | 10/2009 | Brickell et al. | |
| 2009/0255436 A1 * | 10/2009 | Buckman ............. | B60T 11/046 |
| | | | 104/117.1 |
| 2010/0102286 A1 | 4/2010 | Jordan et al. | |
| 2010/0219015 A1 | 9/2010 | Meillet | |
| 2010/0219016 A1 * | 9/2010 | Meillet ................. | F16D 63/006 |
| | | | 188/65.1 |
| 2010/0226748 A1 | 9/2010 | Wolner et al. | |
| 2011/0048853 A1 * | 3/2011 | Brickell .................... | B66D 1/46 |
| | | | 182/5 |
| 2011/0147125 A1 | 6/2011 | Blomberg | |
| 2011/0214940 A1 | 9/2011 | Matharu | |
| 2012/0024119 A1 | 2/2012 | Aldy | |
| 2013/0007991 A1 * | 1/2013 | Khachaturian ......... | F16G 11/08 |
| | | | 24/129 R |
| 2013/0091690 A1 * | 4/2013 | Stephenson ............. | F16G 11/08 |
| | | | 24/583.1 |
| 2013/0095968 A1 | 4/2013 | Stephenson | |
| 2013/0105251 A1 | 5/2013 | Baum | |
| 2013/0248291 A1 | 9/2013 | Jones et al. | |
| 2014/0060970 A1 * | 3/2014 | Zwirn ...................... | E06C 7/16 |
| | | | 182/42 |
| 2015/0114752 A1 | 4/2015 | Bornack | |
| 2015/0368972 A1 * | 12/2015 | Patron ...................... | E06C 7/12 |
| | | | 182/8 |
| 2016/0248238 A1 | 8/2016 | Warren et al. | |
| 2017/0114862 A1 | 4/2017 | Springer et al. | |
| 2018/0083351 A1 * | 3/2018 | Wagner ..................... | H01B 3/28 |
| 2018/0370484 A1 | 12/2018 | Diehl et al. | |
| 2019/0017325 A1 * | 1/2019 | Knickrehm .............. | E06C 7/186 |
| 2019/0277088 A1 | 9/2019 | Ostrobrod | |
| 2019/0338593 A1 * | 11/2019 | Knickrehm .......... | A62B 35/005 |
| 2019/0338830 A1 * | 11/2019 | Jarvis ..................... | B60D 1/58 |
| 2020/0055704 A1 * | 2/2020 | Liu ........................ | B66B 5/04 |
| 2020/0094085 A1 * | 3/2020 | Wilson ............... | A62B 35/0075 |

(56) References Cited

U.S. PATENT DOCUMENTS

2020/0386354 A1* 12/2020 Zoe ................. F16G 15/04
2022/0145703 A1* 5/2022 Atkinson ........... A62B 35/0081
2022/0397002 A1* 12/2022 Brus .................. E06C 7/12

FOREIGN PATENT DOCUMENTS

| | | |
|---|---|---|
| CN | 102588511 A | 7/2012 |
| CN | 102844518 A | 12/2012 |
| CN | 103912632 A | 7/2014 |
| CN | 104203797 A | 12/2014 |
| CN | 105339050 A | 2/2016 |
| CN | 105465274 A | 4/2016 |
| CN | 205477349 U | 8/2016 |
| CN | 205973344 U | 2/2017 |
| CN | 206036129 U | 3/2017 |
| CN | 206338367 U | 7/2017 |
| DE | 202007012803 U1 | 2/2009 |
| DE | 102010009084 A1 | 8/2011 |
| EP | 3 173 178 A1 | 5/2017 |
| GB | 0 159 762 A | 3/1921 |
| GB | 2470370 A | 11/2010 |
| JP | 2899830 B2 | 6/1999 |
| JP | 2011-163525 A | 8/2011 |
| KR | 10-1082257 B1 | 11/2011 |
| WO | WO 1995/016496 A1 | 6/1995 |
| WO | WO 2004/087518 A1 | 10/2004 |
| WO | WO 2012/174473 A1 | 12/2012 |
| WO | WO-2015/014332 A3 | 2/2015 |
| WO | WO-2015/195278 A1 | 12/2015 |

OTHER PUBLICATIONS

International Patent Application No. PCT/US2020/042363; Int'l Preliminary Report on Patentability; dated Jan. 27, 2022; 8 pages.
International Patent Application No. PCT/US2020/042360; Int'l Preliminary Report on Patentability; dated Jan. 27, 2022; 8 pages.
International Patent Application No. PCT/US2020/042360; dated Oct. 9, 2020; 9 pages.
International Patent Application No. PCT/US2020/042363; dated Oct. 15, 2020; 9 pages.
International Patent Application No. PCT/US2018/051819; Int'l Search Report and the Written Opinion; dated Jan. 11, 2019; 15 pages.
International Patent Application No. PCT/US2018/051819; Int'l Preliminary Report on Patentability; dated Oct. 28, 2019; 12 pages.
International Patent Application No. PCT/US2018/042519; Int'l Search Report and the Written Opinion; dated Oct. 29, 2018; 17 pages.
International Patent Application No. PCT/US2018/042519; Int'l Preliminary Report on Patentability; dated Jan. 30, 2020; 13 pages.

* cited by examiner

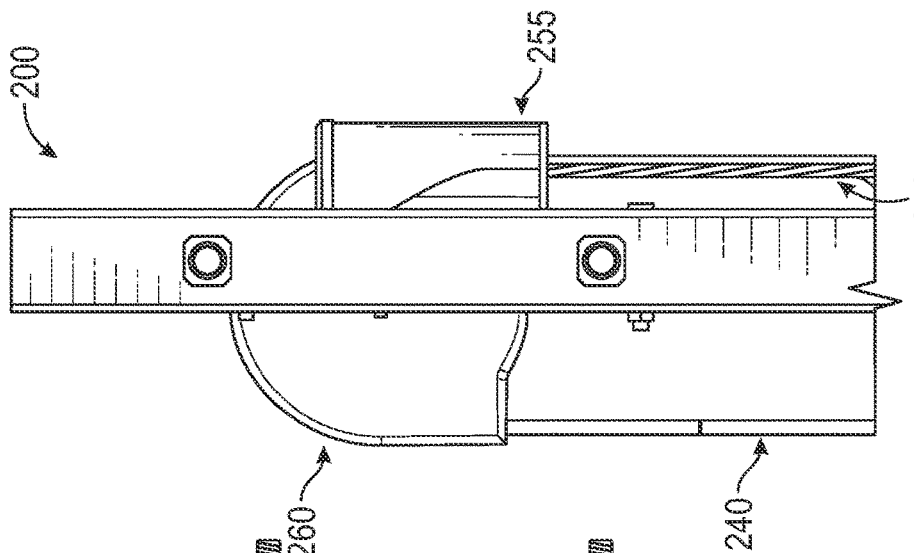
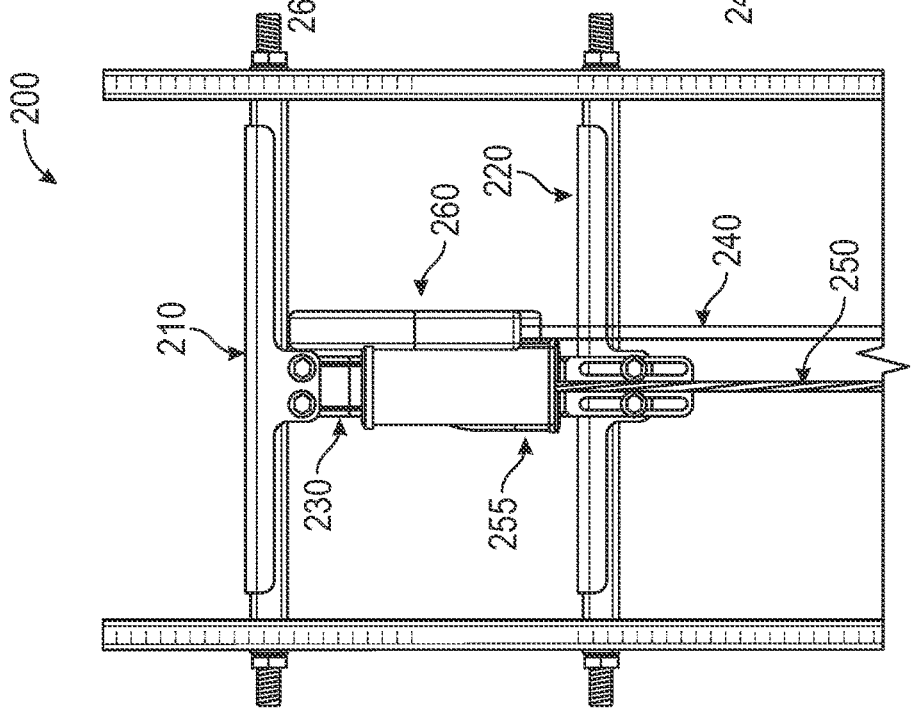
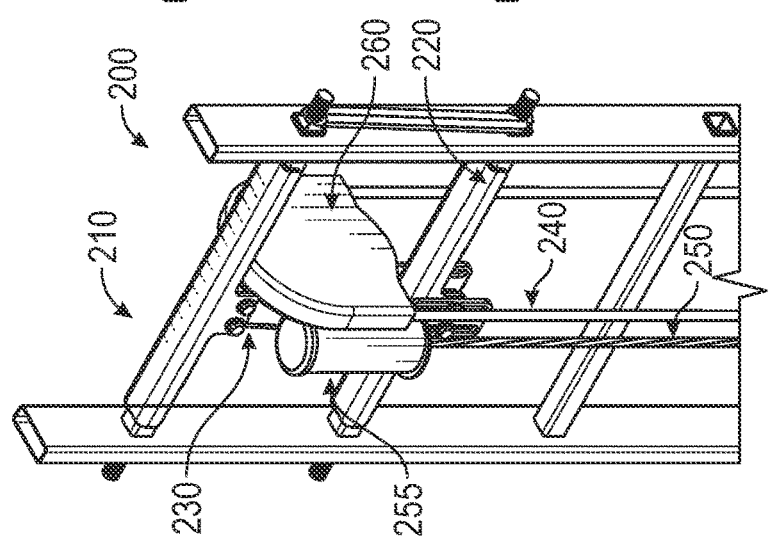

Section A-A

Section A-A

Section A-A

Integrated CA/FAS

Integrated CA/FAS

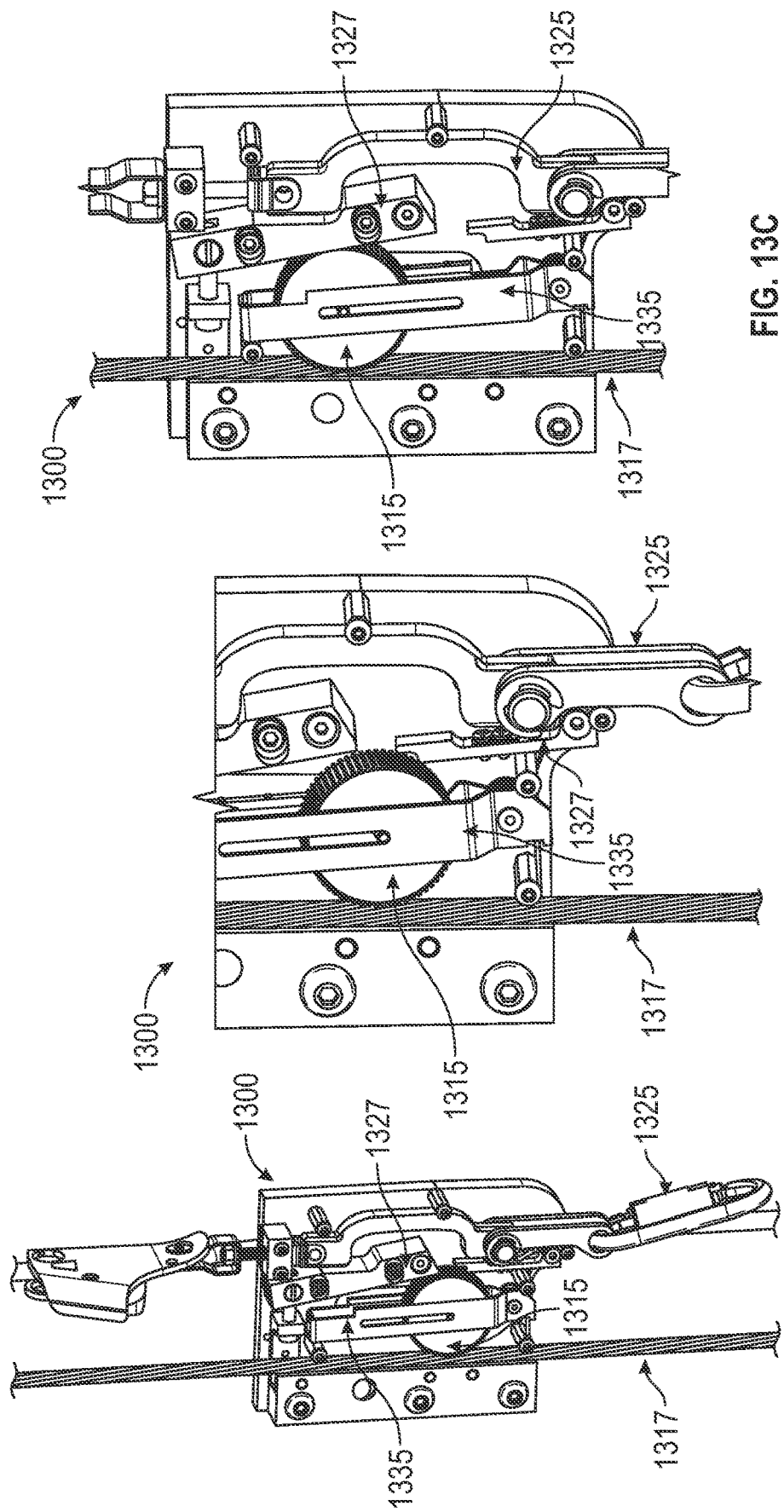

ROPE JOINING

CROSS REFERENCE TO RELATED APPLICATIONS

This application is a Continuation of U.S. patent application Ser. No. 16/513,623 filed Jul. 16, 2019, which is a continuation-in-part application and claims priority to U.S. patent application Ser. No. 16/037,793, filed Jul. 17, 2018, which claims benefit under 35 U.S.C. § 119(e) of Provisional U.S. patent application No. 62/533,600, filed Jul. 17, 2017, the contents of which are incorporated herein by reference in their entirety.

U.S. patent application Ser. No. 16/513,623 is also a continuation-in-part application and claims priority to U.S. patent application Ser. No. 16/135,781, filed Sep. 19, 2018, which claims benefit under 35 U.S.C. § 119(e) of Provisional U.S. patent application No. 62/560,925, filed Sep. 20, 2017, the contents of which are incorporated herein by reference in their entirety.

BACKGROUND

In many high-elevation applications, such as wind turbines, elevator shafts, and building construction sites, technicians and personnel must climb ladders and other elevation devices to access service areas. Climb assist systems aid a climber during ascent and or descent of such devices by providing an upwards force to reduce the level of exertion during the climb, whereas fall arrest systems prevent the climber from falling in the event of a slip or other separation from a ladder during ascent or descent.

Typically, climb assist and fall arrest devices are two separate devices that operate independently of one another. In some climb assist systems, a counterweight provides the assistance to a climber. In other systems, a motorized device rotates a looped belt, providing a predetermined level of assistance.

In addition, common climb-assist systems attach a rope comprising wire, nylon, or other materials, to an individual and use a motor and sheave to provide an upwards force to the rope to aid the individual's ascent, but these systems require significant frictional force between the rope and the sheave to convey the driving force from the motor.

In systems that use continuous ropes and looped configurations, the spliced portion generally has a greater diameter than the remaining portion of the rope. As the rope is continuously driven about the sheave, the diameter differences may require additional elements in the traction system in order to maintain traction and provide the driving force. A diameter difference of only few millimeters, for example, can affect the fit of the rope within the sheave, and cause a loss of traction without such additional elements.

While there are known devices and methods of joining two separate rope ends to effectively form one longer rope are known (e.g., long splices, short splices, swaged terminations, and spelter sockets using molten metal or a polymer), rope configurations and splicing for climb-assist systems must also consider factors such as ease of installation, strength, fatigue life, ability to inspect, and diametric increase. However, many existing rope technologies and techniques maximize results in view of one factor while sacrificing results in one or more of the other categories. Furthermore, in certain applications, such as wind turbine towers and elevator shafts, the ascent to the elevated service area may not be completely vertical. As such, there may be additional contact points between the rope and ladder, and along the ascending route, which must be considered.

There are also often integration issues when installing a climb assist system and fall arrest system to a single application, or elevation device, like a ladder. Climb assist and fall arrest systems designed by different vendors and/or not designed together can be difficult to combine onto an elevation device, and sometimes cannot be installed together.

SUMMARY

The present disclosure is directed towards integrated climb assist and fall arrest systems and methods. In embodiments, a climb assist and fall arrest system comprises a static guide member, such as a cable or a rail; an integrated controller secured to the static guide member, a climb assist belt formed in a continuous loop; an upper mount comprising a first sheave and an upper attachment for the static guide member; a lower mount comprising a motor, a second sheave, and a lower attachment for the static guide member. The motor drives the climb assist belt around a first sheave and a second sheave.

In embodiments, a controller transfers an upwards force to the user from the climb assist belt driven by the motor. The control unit in signal communication with the controller is configured to receive at least one metric from the controller and dynamically adjust the upwards force to the user. In embodiments, the system prevents downward movement in the event of a fall by locking to the static guide member when at least one of a threshold velocity and/or acceleration is detected.

In an aspect, a level of climb assistance can be selected by a user vertically ascending or descending an elevation device, such as a ladder. A control unit can continuously analyze a load measured at the controller, indicative of a force between the user and climb assist belt, and indicative of a current level of climb assistance. The motor then dynamically adjusts to continuously provide the desired level of climb assistance. In embodiments, the controller is attached to the static fall arrest cable and can provide a braking force and/or prevent downward movement by locking to the static fall arrest cable when at least one of a threshold velocity and/or acceleration is detected.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings.

In the drawings:

FIG. 2A illustrates an elevated angled view of an upper mount in accordance with embodiments discussed herein.

FIG. 2B illustrates a front view of an upper mount in accordance with embodiments discussed herein.

FIG. 2C illustrates a side view of an upper mount in accordance with embodiments discussed herein.

FIG. 13A illustrates an integrated controller's fall arrest operation in accordance with embodiments discussed herein in the event an acceleration past threshold is detected.

FIG. 13B illustrates an integrated controller's fall arrest operation in accordance with embodiments discussed herein in the event a velocity past threshold is detected.

FIGS. 13A-13C illustrate an integrated controller's fall arrest operation in accordance with embodiments discussed herein in the event an acceleration past threshold is detected.

DETAILED DESCRIPTION OF ILLUSTRATIVE EMBODIMENTS

Figure 1:
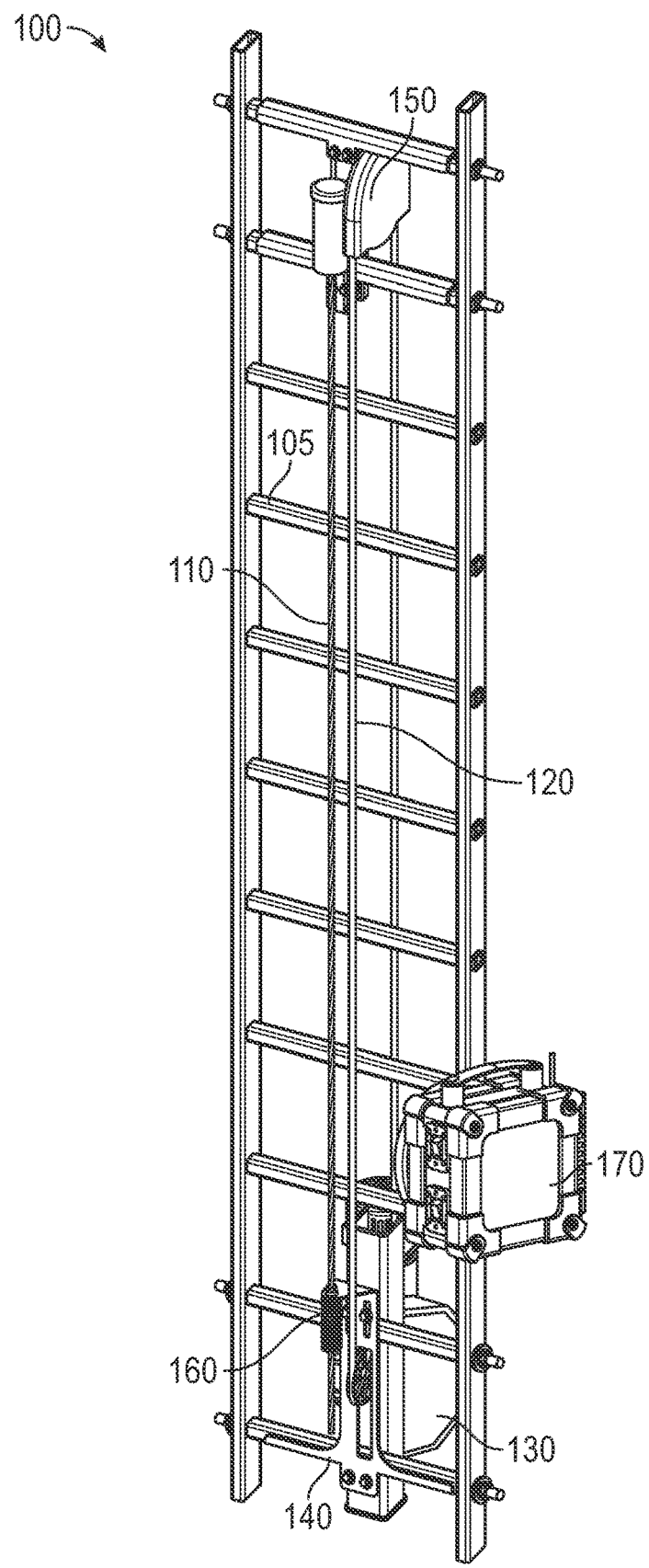
FIG. 1 illustrates an integrated climb assist and fall arrest system in accordance with embodiments discussed herein.
Figure 3B:
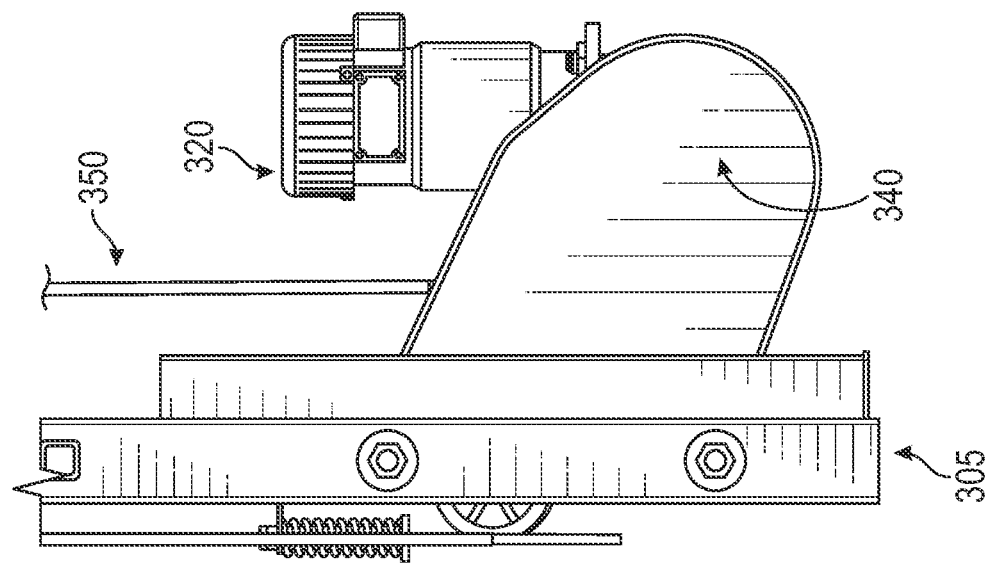
FIG. 3B illustrates a side view of a lower mount in accordance with embodiments discussed herein.
Figure 3A:
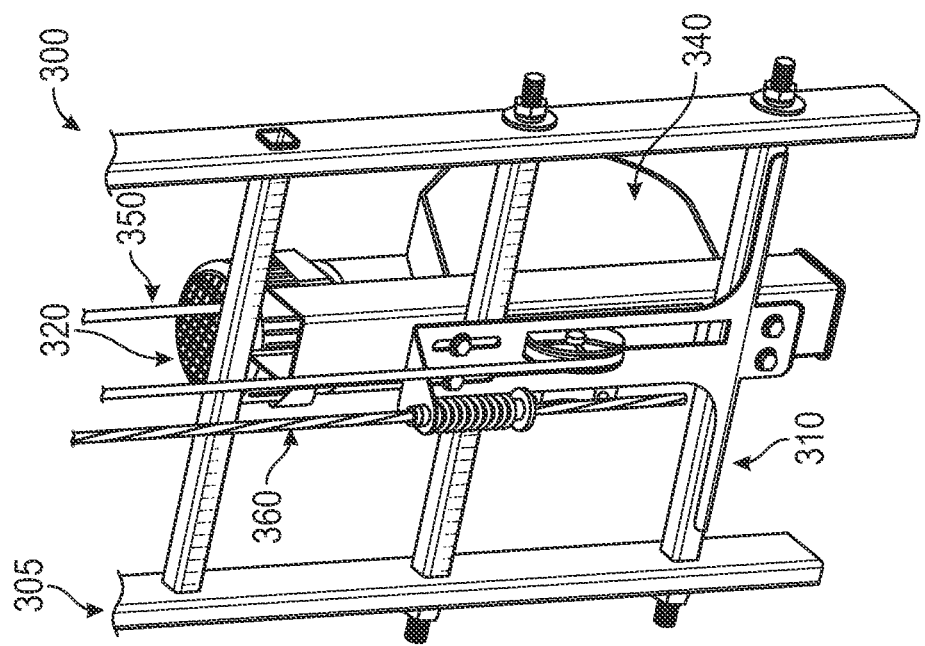
FIG. 3A illustrates an elevated angled view of a lower mount in accordance with embodiments discussed herein.
Figure 3D:
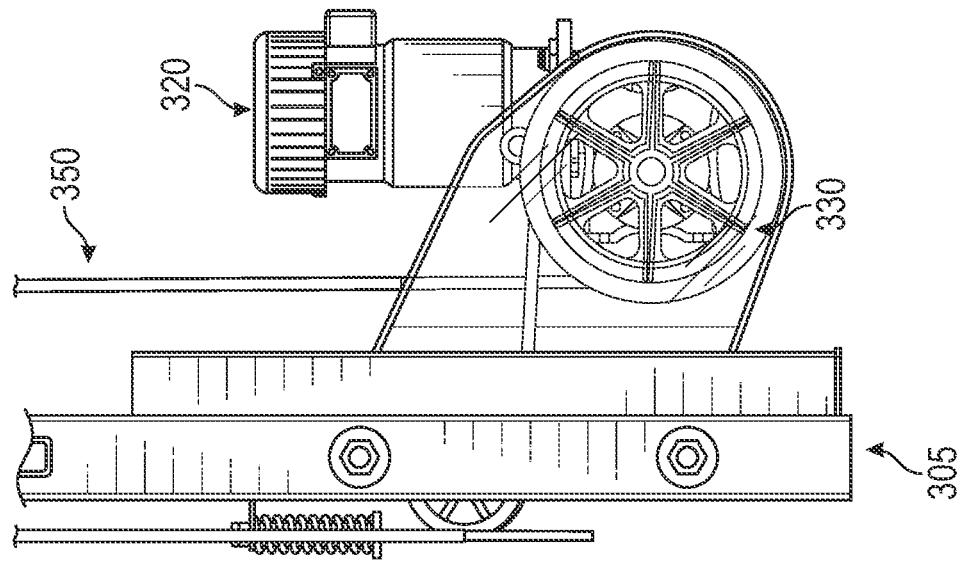
FIG. 3D illustrates a side view of a lower mount and sheave in accordance with embodiments discussed herein.
Figure 3C:
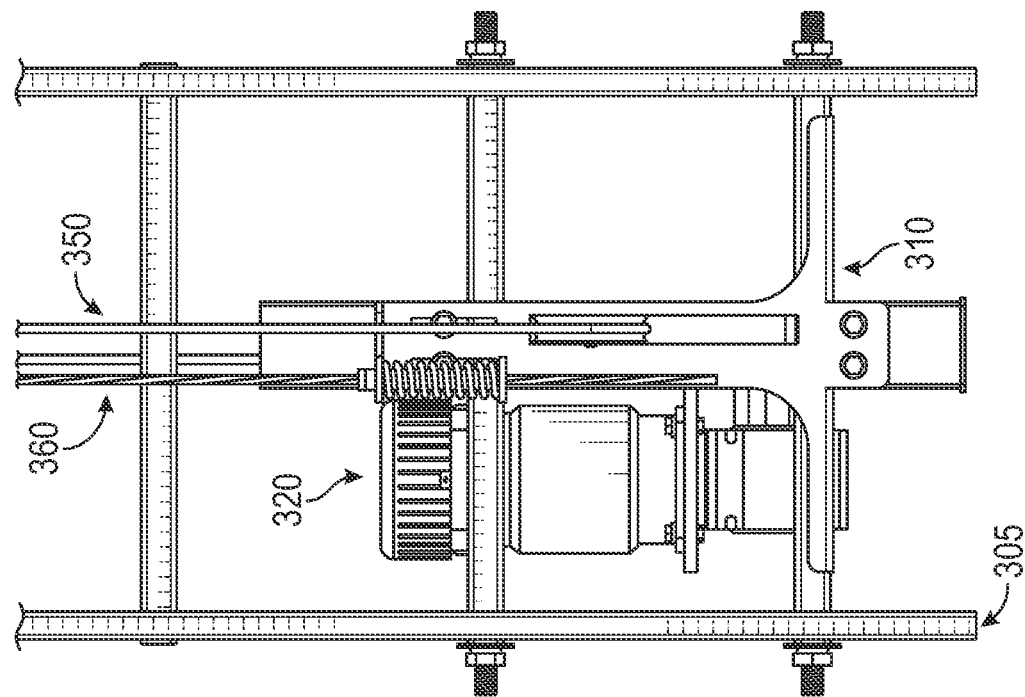
FIG. 3C illustrates a front view of a lower mount in accordance with embodiments discussed herein.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of the present disclosure.

The present disclosure is generally directed to integrated climb assist and fall arrest systems comprising an upper mount, a lower mount, a motor, a movable climb assist belt, a static fall arrest member, such as a cable, and an integrated controller secured to the climb assist belt, the fall arrest member, and a harness worn by a user. The integrated design increases safety for climbers by preventing falls before they occur. Safety is further improved by a decrease in fall distances and velocities when systems are used in combination. The disclosed systems and methods also allow for applications to hub heights greater that 100 meters, for example over 150 meters in height, such as in wind turbines. Embodiments discussed herein can be designed to meet a plurality of industry safety and design standards, including but not limited to ANSI (American National Standards Institute), UL (Underwriters Laboratories), CSA (Canadian Standards Association), CE (Conformité Européenne), EN (European Standards), IP/NEMA (Ingress Protection/National Electrical Manufacturers Association), OSHA (Occupational Safety and Health Standards), and HSE (Health, Safety & Environment).

Figure 17C:
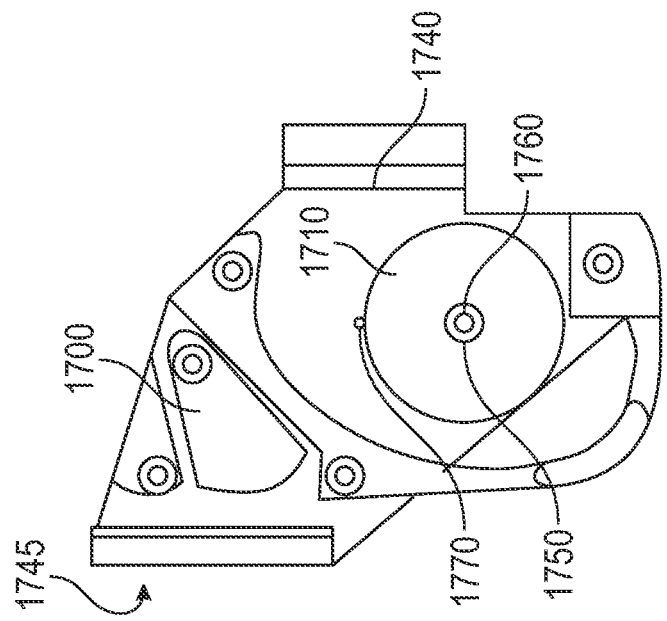
FIG. 17C illustrates a top plan view of a third layer of the climb assist and fall arrest device illustrated in FIG. 17A.
Figure 17B:
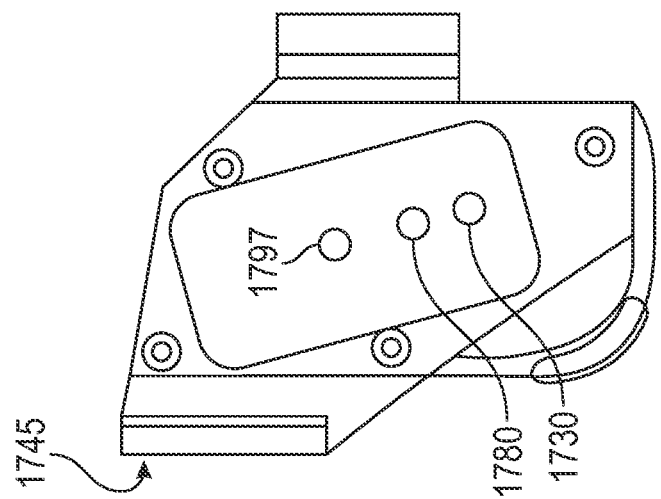
FIG. 17B illustrates a top plan view of a second layer of the climb assist and fall arrest device illustrated in FIG. 17A.
Figure 17A:
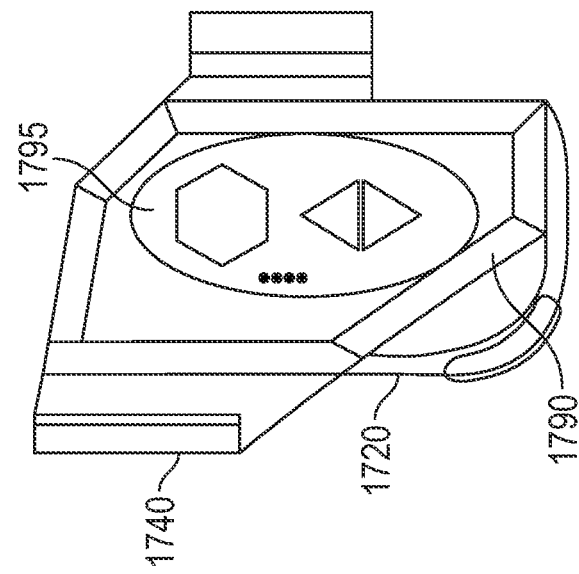
FIG. 17A illustrates a top plan view of a first layer of a climb assist and fall arrest device of the climb assist and fall arrest system illustrated in FIG. 15, according to one aspect of the disclosure.

FIG. 1 illustrates an embodiment of an integrated climb assist and fall arrest system 100 applied on a ladder. The system comprises a static fall arrest member, represented by cable 110, a movable climb assist belt 120, a motor and drive sheave assembly 130, an integrated lower mount 140, and an integrated upper mount 150. The static fall arrest cable 110 is further provided with an integrated access controller (See, e.g., FIGS. 11, 13, and 17) which attaches preferably to a harness on the climber and prevents downward movement when a fall is detected. The movable climb assist belt 120 likewise attaches the integrated access controller and provides the upward force to assist a climber during ascent or descent. During descent, for example, the climb assist belt provides an upward force to counteract the weight of the climber to relieve stresses on the climber, e.g., knee joints, etc.

The motor and drive sheave assembly 130 drives the climb assist belt 120 around the integrated lower mount 140 and upper mount 150. In embodiments, the user can indicate a predetermined force and/or level of climb assistance on a controller, which is communicatively coupled to the motor and drive sheave assembly 130. The controller controls the power output of the motor, allowing for more or less assistance, as well as starting and stopping the system's operation.

In embodiments, one or more ladder rungs can comprise reinforcements 160 to provide additional support and/or stability to the climb assist and fall arrest system. In an example, the upper mount 150 is attached to one or more rungs near the top of a ladder, and the lower mount 140 is similarly attached to one or more rungs at the base of the ladder. It will be appreciated that the upper and lower mounts are not limited to placement on a ladder or rungs. Depending on the elevation device, the service area, service platform and/or the layout of the area to which the climber is ascending, the upper and lower mounts may be secured on platforms, guard rails, permanent fixtures, and other structures that allow the moving climb assist belt 120 to follow the climbing path. In exemplary embodiments, the upper and lower mounts are positioned in an attempt to prevent the climb assist belt 120 from contacting the rungs 105 or other structures except for the upper and lower mounts during rotation, thus preventing unnecessary wear and tear on the ladder rungs 105.

The system can further comprise a control unit 170, which can be placed at the base of the ladder, for example, and can be communicatively coupled to the controller, which attaches to the climb assist and fall arrest cables. In embodiments, signals transmitted to the control unit can contain information about one or more metrics including speed, acceleration, forces on each of the cables, and system operation information. In embodiments, as discussed herein, the control unit further comprises a computing device having a memory and processor.

FIGS. 2 and 3 respectively illustrate the upper and lower mounts in accordance with various embodiments described herein. In embodiments, the integrated upper and lower mounts comprise a universal mounting for easy application to structures, like ladder rungs. In this manner, the mounts can be easily centered and secured on the rungs. FIGS. 2A-B illustrate an upper mount 200 for application to the top of an elevation device. The upper mount can comprise a mounting 210 fitted to at least one rung on a ladder. A second mounting 220 can be applied to a second rung for additional stabilization and security. Additional mountings may be provided as needed for additional strength. The upper mount 200 further comprises a central support structure 230 upon which a support 255 for the fall arrest cable 250 and a sheave for the climb assist belt 240 attaches. In embodiments, a cover 260 surrounds the sheave. Support 255 may incorporate shock absorbing elements such as rubber bushings, springs, or deformation members. FIG. 2C illustrates a side view of the upper mount 200, and in particular, the placement of the upper mount structure preferably to minimize contact between the belt 240 and cable 250 with the rungs of the ladders.

FIGS. 3A-D illustrate a similar mounting structure to the lower rungs of a ladder 305. In embodiments, the rung attachment may be to a single rung, similar to the upper mount of FIG. 2. Alternatively, or additionally, the attachment 310 can be mounted to two or more rungs. The lower mount complex further comprises attachments for both the fall arrest cable 360 and the climb assist belt 350, as well as a motor 320.

The motor 320 attaches to the lower mount complex and drives a sheave 330, around which the climb assist belt 350 rotates. In embodiments, the sheave may be surrounded by a casing 340 or otherwise covered for safety purposes, and to prevent dirt, moisture, debris, and other items from contacting and affecting the sheave 330 and/or climb assist belt 350. In these embodiments, the lower mount is centrally located on the rung. This configuration provides adequate space for a climber to use the rung for climbing Similar to the upper mount depicted in FIG. 2C, the lower mount can be positioned such that the climb assist belt and fall arrest cable 360 minimally contact the rungs of the ladder.

Accordingly, in applications, such as a wind turbine, the integrated upper and lower mount can precisely position the cables such that there is minimal interference with areas of the wind turbine, such as the yaw deck hatch, high-voltage cables, other wires. The cables must be able to run down the back side of the ladder (see FIGS. 2C, 3D) without contact which could cause wear to the cables. In other applications, the integrated upper and lower mount complies with one or more standards, e.g., OSHA, and provides a certain amount of clearance between the cables and other structures. Similarly, the positioning of the fall arrest cable and climb assist belt could have different termination locations, depending on the particular application of installation, and one or more considerations.

Figure 4A:
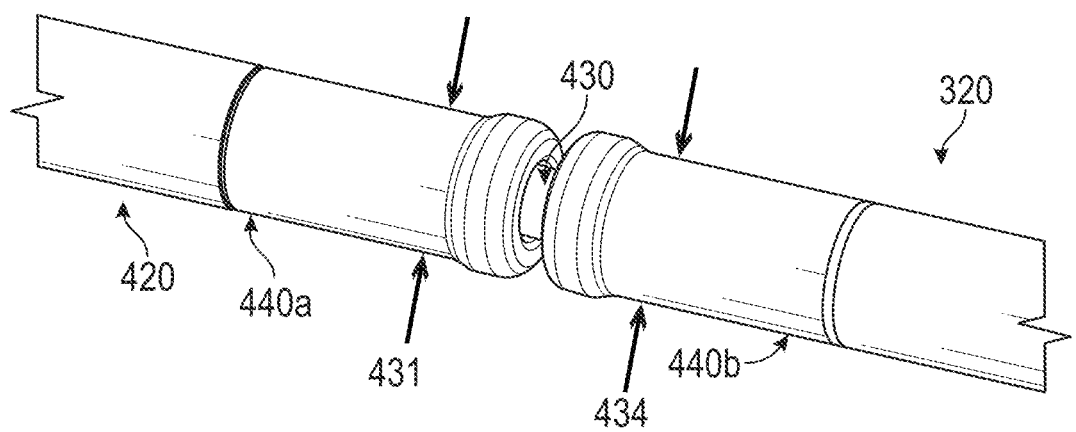
FIG. 4A illustrates an external view of a climb assist belt in accordance with embodiments discussed herein.
Figure 4B:
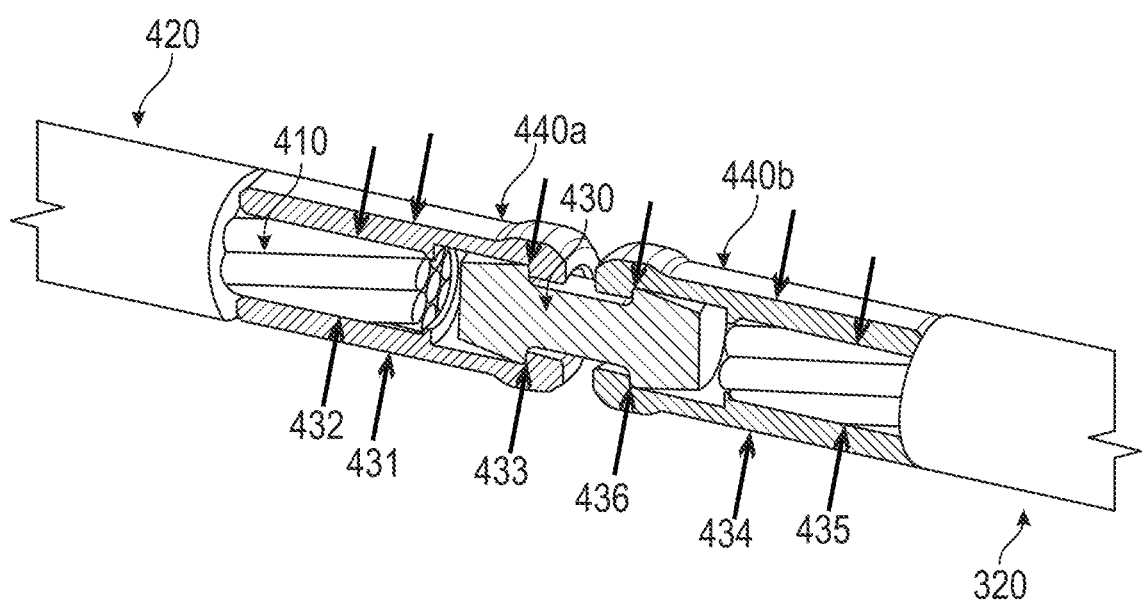
FIG. 4B illustrates a cross-sectional view of a climb assist belt in accordance with embodiments discussed herein.

FIGS. 4A-E illustrate moveable climb assist belt joint embodiments, usable with one or more systems and methods described herein. FIG. 4A depicts an external view of the belt, specifically the area at which ends of the cable are joined to make a continuous loop, while FIG. 4B illustrates a cross section of the same area. The belt comprises a core 410 having a plurality of strands, which may be twisted, braided, or otherwise constructed to have increased overall strength. The core can comprise a plurality of materials, including but not limited to steel. The core is surrounded by a protective coating 420, which can comprise any of a plurality of materials, including but not limited to polyurethane.

Figure 4C:
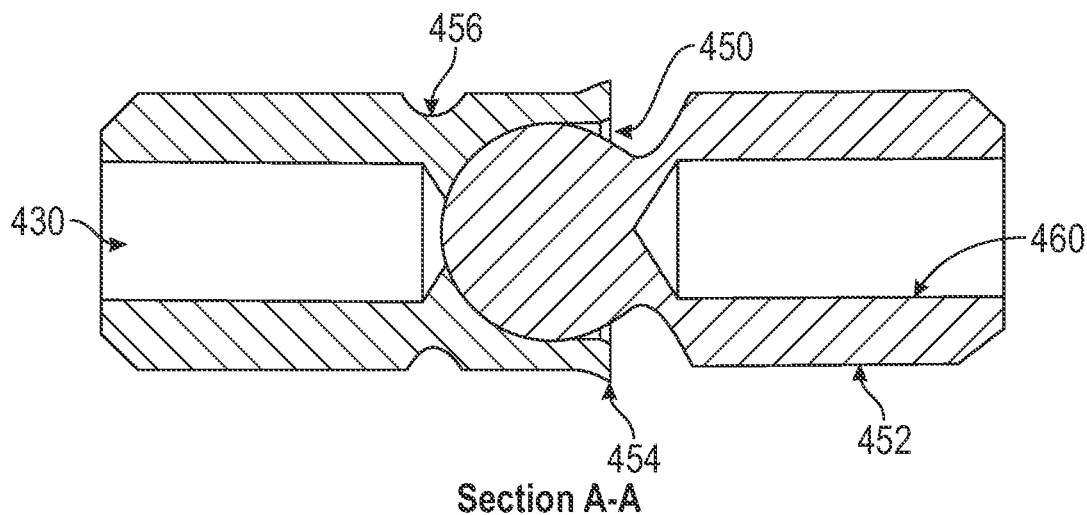
FIG. 4C illustrates a cross-section view of a climb assist belt having a spherical joint in accordance with embodiments discussed herein.

A link 430 connects two ends of the cable to form the loop. In embodiments, the link connects two end caps 440a, 440b that may be the same or a different material that the protective coating material. The first end cap 440a has a first outer diameter 431. The first end cap 440a includes a first opening on a first side of the first end cap 440a defining a first anulus to receive a first end of the rope 410. The first anulus has a first body diameter 432. The first end cap 440a includes a second opening on a second side of the first end cap 440a, the second opening opposite the first opening. The second opening defines a first cavity configured to receive the link 430. The first cavity has a first anulus diameter 433. The first anulus diameter 433 is a greatest diameter of the first cavity. The first anulus diameter 433 is greater than the first body diameter 432 and less than the first outer diameter 431. The second end cap 440b has a second outer diameter 434. The second end cap 440b includes a third opening on a first side of the second end cap 440b defining a second anulus to receive a first end of the second rope 410. The second anulus has a second body diameter 435. The second end cap 440b has a fourth opening on a second side of the second end cap 440b opposite the third opening. The fourth opening defines a second cavity configured to receive the link 430. The second cavity has a second anulus diameter 436. The second anulus diameter 436 is a greatest diameter of the second cavity. The second anulus diameter 436 is greater than the second body diameter 435 and less than the second outer diameter 434. The first outer diameter 431 is the same as the second outer diameter 434. The link is comprised of two ends with a 1st outer diameter and a center portion that is largely cylindrical with a 2nd diameter that is smaller than the 1st diameter. In embodiments, the two ends of the link may be truncated cones, spheres, cylinders, or other similar constructions, as illustrated in FIGS. 4C-E.

The ends caps on one end can have an anulus with an inner 3rd diameter that is larger than the 2nd diameter but smaller than the 1st diameter such that once the anulus is placed over the link's end, it cannot be removed. Other inner locking configurations can form a secure connection with the link 430, and prevent the continuous loop from breaking once tensile force is applied to the cable. In embodiments, the end cap can be configured to be fastened through swaging, crimping, wrapping, adhesives, friction fit, and the like. As such, embodiment may be more easily constructed, more reliable than thermowelding or other methods, and still assembled in the field FIGS. 4C-E illustrate cross-sectional view of various joint section embodiments. In these examples, FIG. 4C illustrates a ball joint embodiment, wherein a spherical mating surface 450 links with the opposite end of the cable to form the continuous loop. A swage section 452 can surround the wire rope 430 or cable cavity 460, as well as a partial portion of the joint section to allow flexibility and movement. The swage material 454 can also be formed such that an indentation, or swage stop indicator 456 identifies the point at which the wire rope or cable 430 ends.

Figure 4D:
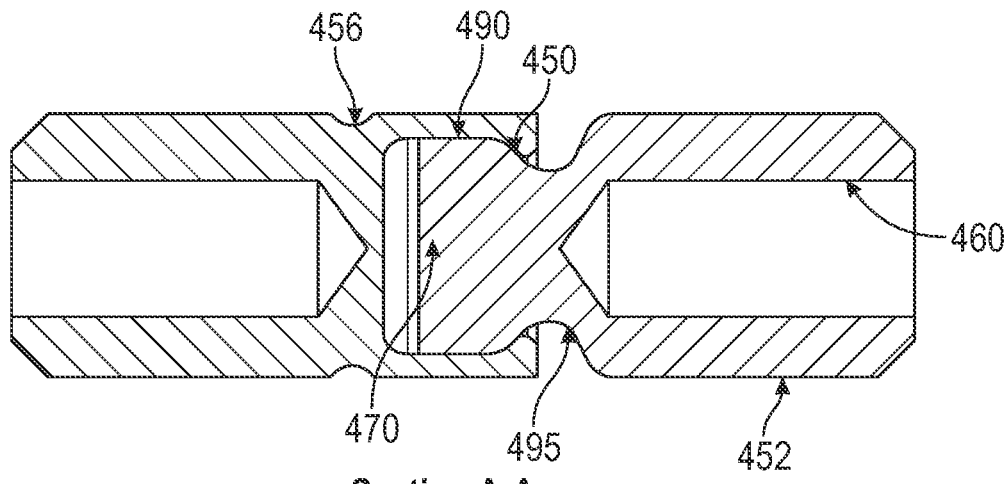
FIG. 4D illustrates a cross-section view of a climb assist belt having a truncated ball joint in accordance with embodiments discussed herein.
Figure 4E:
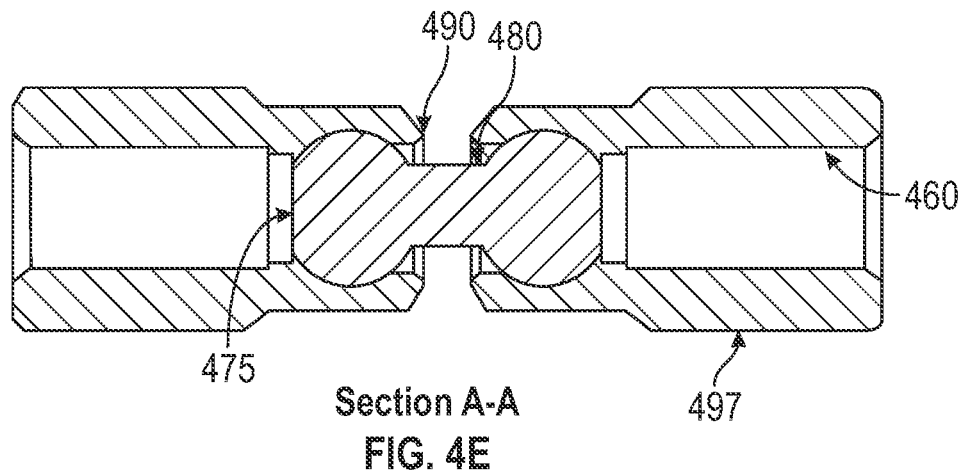
FIG. 4E illustrates a cross-section view of a climb assist belt having a double truncated ball joint in accordance with embodiments discussed herein.

FIG. 4D illustrates a truncated ball embodiment, and FIG. 4E illustrates a double ball link embodiment. With respect to FIG. 4D, a truncated ball 470 fits within an assembly ramp 490 and a spherical mating surface 450 of the joint. The truncated ball may be flat, curved, or otherwise shortened on an end. The joint may further comprise a neck 495 section, which allows flexibility relative to the attachment area, and a swage stop indicator 456 can also be present. The embodiment FIG. 4E is similar, with a truncated ball 475 on both ends of the double ball link 480, similar to FIG. 4B. There may be an assemble ramp 490 on the swage section, and the swage surface 497 can be configured similarly to the prior embodiment discussed herein.

Figure 5A:
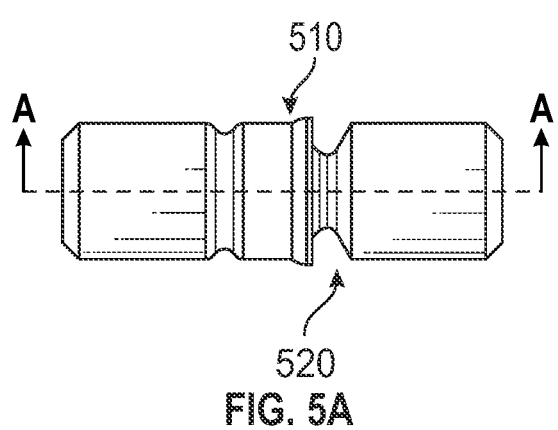
FIG. 5A illustrates a outer, side view of a joint section in accordance with embodiments discussed herein.
Figure 5B:
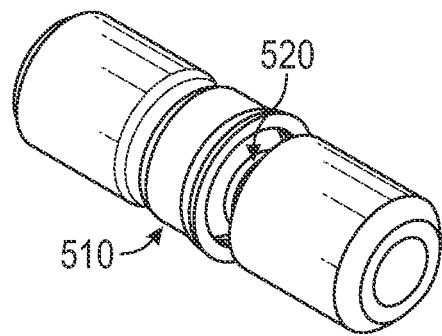
FIG. 5B illustrates an elevated, angled view of a joint section in accordance with embodiments discussed herein.
Figure 5C:
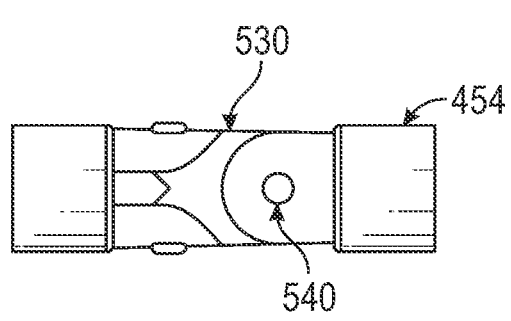
FIG. 5C illustrates a side view a joint section having a spider and pivot pin, in accordance with embodiments discussed herein.
Figure 5D:
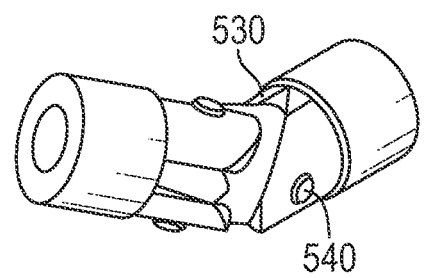
FIG. 5D illustrates a joint section in accordance with embodiments discussed herein.

FIGS. 5A-D further illustrate outer view and types of joint embodiments in accordance with the above. FIGS. 5A and 5B depict an example design of the joint section. The outer portion can be a swaged design, wherein a first outer diameter 510 and a center portion that is largely cylindrical has a second diameter 520 that is smaller than the first diameter. In embodiments, the two ends of the link may be truncated cones, spheres, cylinders, or other similar constructions. FIGS. 5C and 5D illustrate a pivot design, in which the two ends of the link can be joined by one or more pivot pins. In embodiments, the joint can further be a spider joint design 530, allowing the joint to twist in one or more directions. The present embodiments can be adapted to smoothly travel over a traction sheave and other components of the climb assist and fall arrest system, as disclosed herein.

Figure 6A:
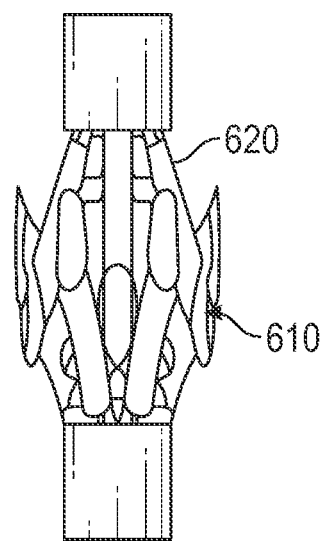
FIG. 6A illustrates a side view a joint section with overlapping lays in accordance with embodiments discussed herein.
Figure 6B:
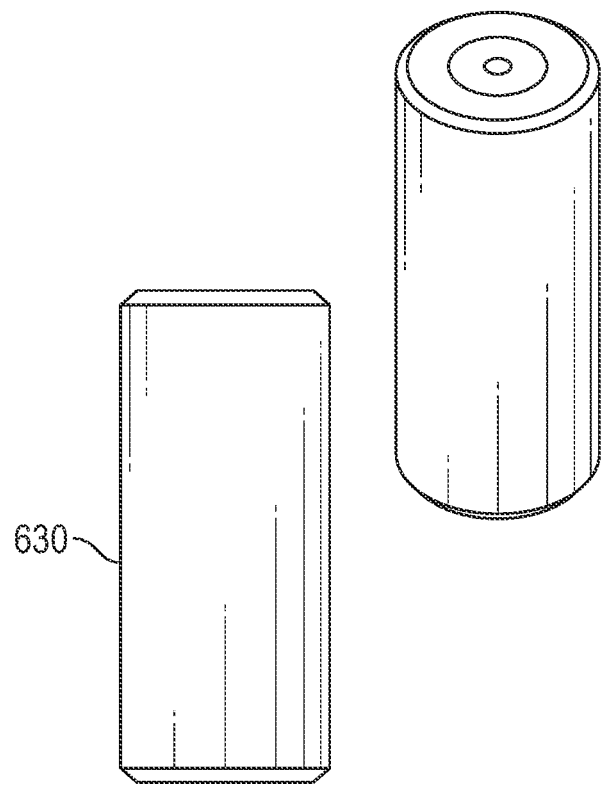
FIG. 6B illustrates a outer view of a joint section in accordance with embodiments discussed herein.

FIG. 6A illustrates another example of a joint design. A plurality of overlapping lays 610 can be arranged around the circumference of each end of the joint and interwoven with oppositely facing lays. The joint section can be further ramped to guide the individual lays 620 in a particular direction. The lays can be configured such that when there is tension on the rope, the lays lock, i.e., secure to one another, to counter the tension, and prevent separation and breakage at the joint area. FIG. 6B illustrates an example covering which can be placed around the lays of FIG. 6A, or any of the preceding embodiments. The covering can comprise a smooth external surface 630 and have a diameter that is consistent with the rest of the wire rope cable, swaged design, or within a particular diametric threshold, in accordance with particular design configurations.

In each of these embodiments, the connecting area of the cable further enables smooth travel of the rope around the upper and lower sheave. In this manner, and when the cable has a uniform outer diameter, frictional damage and wear to both the cable and the ladder rungs are minimized. In examples, the belt may comprise a 6 mm core, with a Minimum Breaking Strength (MBS) of 5,500 lbs. In addition, the belt can comprise a polymer extrusion, and have a 10 mm overall diameter, which includes both the core and protective covering. The mechanical connection between the link 430 and end caps 440 can be rated to 3500 pounds.

FIGS. 4-10 illustrate various rope connection systems and methods in accordance with embodiments described herein. The disclosed systems and methods can be used, in whole or in part, to form a joint section and the continuous loop of wire rope.

In various embodiments, the wire rope may be a single rope or a plurality of ropes, such as two or more portions of rope combined through various splicing techniques. In some embodiments, the wire rope contains no overlapping portions of rope, specifically no overlapping portions at the joint section. This can be accomplished, for example, through a butt joint, using a connector to secure each end of the rope, and other splicing techniques. In this manner, the diameter of the looped rope, including the joint section stays substantially the same as the rest of the wire rope. As discussed herein, a uniform diameter can protect the integrity of the rope by preventing unnecessary frictional wear and damage during interactions with the ladder, sheave, and other contact points.

In some embodiments, a portion of the wire rope strands overlap at the joint section. In such embodiments, the joint section maintains a minimized diameter, for example, no greater than approximately 80% over the wire rope diameter. For example, a 6 mm wire rope with overlapping portions at the joint section would have a joint section up to about 11 mm. By limiting the diameter of the joint section, as described herein, damage to ladder rungs it may contact while moving may be prevented or controlled. A uniform or substantially uniform diameter in the wire rope ensures a better traction around a single sheave. Compared to looped ropes having substantially greater joint section diameters, the disclosed embodiments enable the driving force to be applied by a single traction sheave, while minimizing damage to ladder rungs or other fixed elements that may be contacted during use.

In some systems and methods, the joint section may be formed while the length of the rope is pre-tensioned. In this manner, the rope can be aligned with and installed on the various components of the climb assist system prior to becoming a continuous loop. This promotes efficient replacement of a wire rope, e.g., after extensive use, damage, etc., because other system components interacting with the rope, such as the sheave and anchors, need not be removed during the process.

The joint section can also be configured to maintain a significant portion of the tensile strength of the original wire rope. In embodiments, the looped rope preferably retains approximately 75% of the tensile strength or more of the original wire rope. Combined with the diameter limitations set forth above, embodiments provide a significant strength and durability advantage over traditional wire ropes.

Various embodiments discussed herein promote ease and efficiency. For example, joining the ends of the wire rope using disclosed connector and/or splicing techniques allow quick formation and simplified installation such as by using only simple hand tools. In various embodiments, the connection at the joint section is clearly visible to allow regular, visual inspection for damage and excessive wear.

A protective coating can also be added to wire rope to increase its durability and lifespan. Since contact with the sheave induces frictional wear on the wire rope, the protective coating can reduce frictional damage to the wire rope, the traction sheave, and contact points along the structure. As briefly discussed above, when the climb assist system is installed on a ladder, the rope can contact one or more points along the ladder, such as a rung. When the wire rope is driven, the friction along that contact point can cause damage to both the rung and the wire rope. However, a protective coating can reduce frictional damage, and help maintain the integrity of the wire rope. The protective coating, which surrounds both the joint section and remaining portion of the wire rope, can be applied to form and maintain and consistent diameter along the entire wire rope. In this manner, a uniform diameter reduces frictional wear and potential alignment issues within grooves of the sheave and anchor or pulley components. Accordingly, durability and lifespan of the wire rope can be increased. In embodiments, the protective coating comprises polyurethane, however, it will be appreciated that the coating may be any number of materials or combination of materials to accomplish the purposes described herein.

Figure 7A:
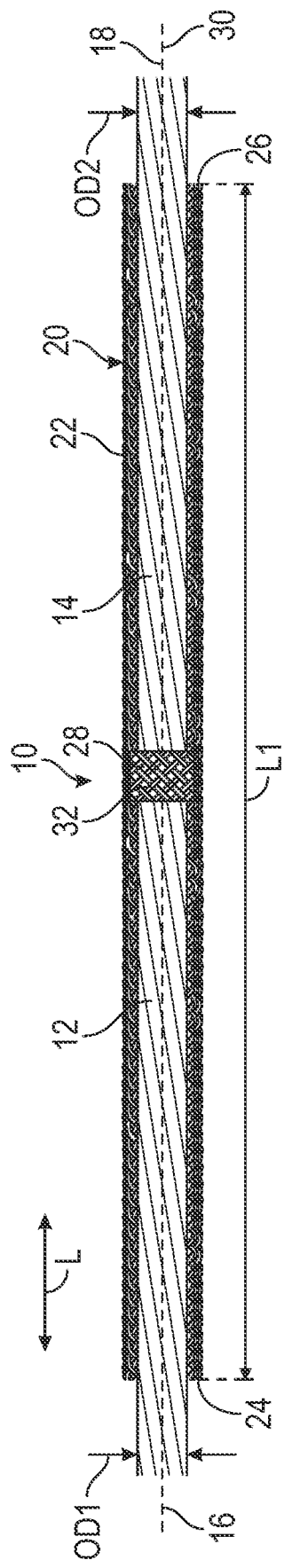
FIG. 7A is a side cross-sectional view of a rope connection system including a first rope, a second rope, and a rope connection device according to an embodiment.
Figure 7B:
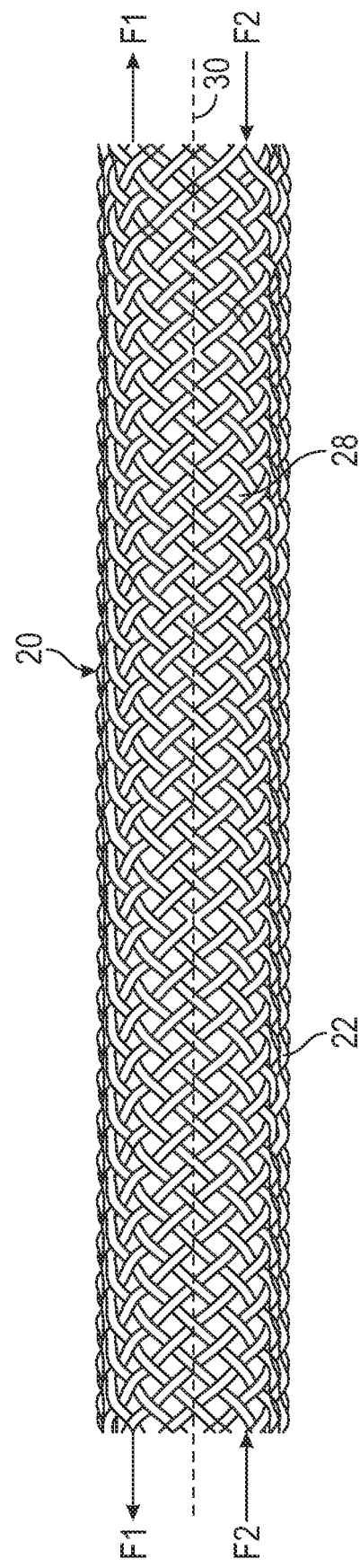
FIG. 7B illustrates a side elevation view of the rope connection device illustrated in FIG. 7A.
Figure 7C:
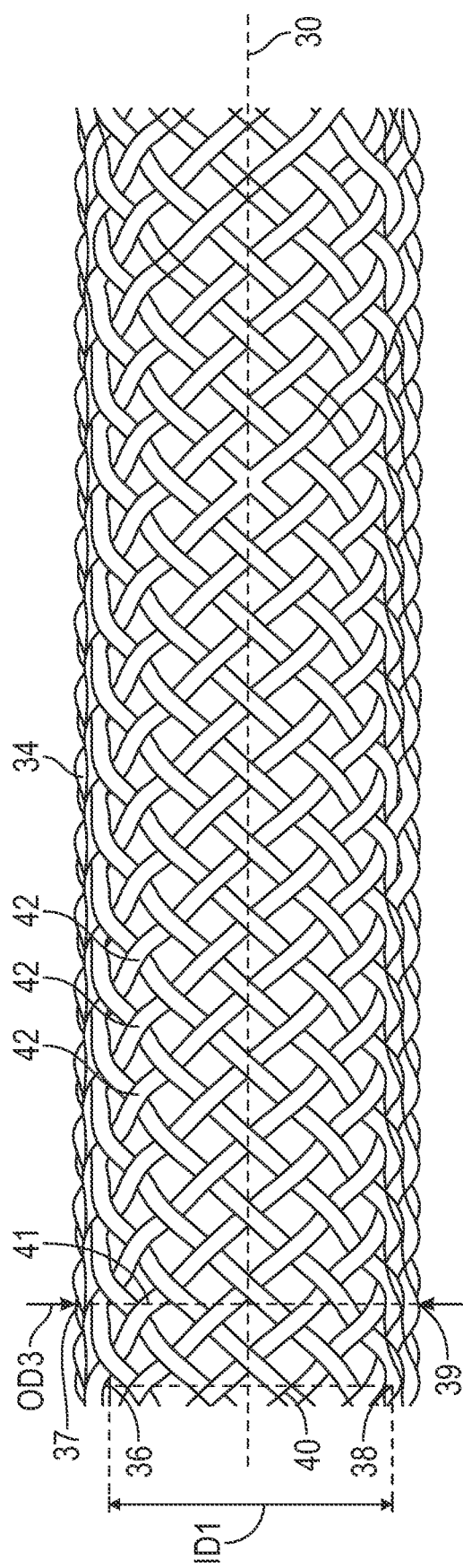
FIG. 7C illustrates a side elevation view of an enlarged portion of the rope connection device illustrated in FIG. 7B.

Referring now to FIGS. 7A-C, a rope connection system 10 is configured to join a first rope 12 to a second rope 14. The system 10 may include a plurality of ropes including the first rope 12 and the second rope 14. The system 10 may further include a rope connection device 20 configured to join two ropes, for example one of the plurality of ropes to another of the plurality of ropes, or the first rope 12 to the second rope 14.

The first rope 12 extends along a first rope axis 16, and defines an outer dimension OD1 measured along a straight line that perpendicularly intersects the first rope axis 16. The second rope 14 extends along a second rope axis 18, and defines an outer dimension OD2 measured along a straight line that perpendicularly intersects the second rope axis 18. As shown in the illustrated embodiment, the outer dimensions OD1 and OD2 are substantially equal. The plurality of ropes may include ropes with outer dimensions different than OD1 and OD2.

One or more of the plurality of ropes may include a structure fastened to an end of the rope to prevent fraying of the rope. According to one embodiment, the structure is a rope end cap configured to be installed onto the respective rope prior to inserting the respective rope into the device 20. The rope end cap may be configured to be installed on one of the first rope 12 or the second rope 14. Alternatively, the rope end cap may be configured to be installed on both the first rope 12 and the second rope 14. The rope end cap may be configured to be fastened through crimping, wrapping, adhesives, friction fit, etc.

The device 20 includes a device body 22 having a first end 24 and a second end 26 spaced apart along a longitudinal direction L. The device body 22 defines a length L1 measured from the first end 24 to the second end 26 along the longitudinal direction L. As shown in the illustrated embodiment, the device 20 may be elongate along the longitudinal direction L.

The device body 22 include a tubular shape that defines a through hole 28 that extends through the device body 22. The through hole 28 may extend along a device central axis 30. The device body 22 includes an inner surface 32, which faces the device central axis 30, and the device body 22 further includes an outer surface 34, which faces away from the device central axis 30. Thus, the inner surface 32 is positioned radially inward of the outer surface 34 with respect to the device central axis 30. The device body 22 defines an inner dimension ID1 measured from a first point 36 on the inner surface 32 to a second point 38 on the inner surface 32 along a straight line 40 that both intersects and is perpendicular to the device central axis 30. As shown in the illustrated embodiment, the inner dimension ID1 may be an inner diameter. The device body 22 defines an outer dimension OD3 measured from a first point 37 on the outer surface 34 to a second point 39 on the outer surface 34 along a straight line 41 that both intersects and is perpendicular to the device central axis 30. As shown in the illustrated embodiment, the outer dimension OD3 may be an outer diameter.

The device body 22 is configured to be such that the length L1, the inner dimension ID1, or both may change in response to a force applied to the device body 22. For example, the device body 22 may be configured such that a "pull" force F1 applied to both the first end 24 in a direction away from the second end 26, and to the second end 26 in a direction away from the first end 24 increases the length L1, decreases the inner dimension ID1, or both. The device body 22 may be configured such that a "push" force F2 applied to both the first end 24 in a direction toward the second end 26, and to the second end 26 in a direction toward the first end 24 decreases the length L1, increases the inner dimension ID1, or both.

The device body 22 may include a plurality of members 42, for example wires or wire strands. The plurality of members 42 may be wound at an angle relative to the device central axis 30. Each of the plurality of members 42 terminates at opposed first and second strand ends. Each of the first strand ends may be mechanically connected to each other, for example by a ring member. Additionally or alternatively, each of the second strand ends may be mechanically coupled together. Alternatively, each of the first strand ends may be spaced apart from and unconnected with the others of the first strand ends. Alternatively, the device body 22 may be monolithic.

Figure 7D:
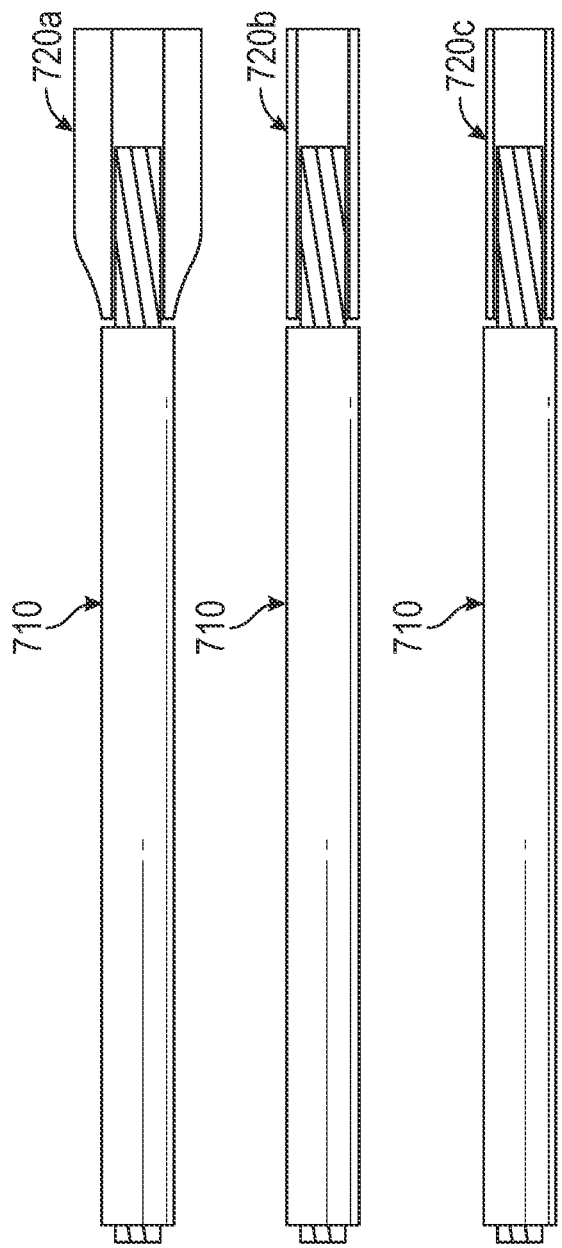
FIG. 7D illustrates side views of a rope connection device in accordance with embodiments discussed herein.

FIG. 7D illustrates additional examples of wire rope connecting systems, particularly the wire rope coating 710 and connection elements, 720a-c. The rope coating 710 can cover a steel wire rope for example, and the connection elements 720 can vary in their design configuration. For example, connection element 720a can have a larger diameter than the wire rope coating diameter. In another embodiment, the connection element 720b is equal in diameter with the wire coating. In a third embodiment, the connection element 720c can have a smaller diameter than the wire coating. It will also be appreciated that the connection elements are not limited to such designs, and can have, for example, a variable diameter around the wire rope. Each of these designs can be chosen based on one or more design, preference, manufacturing, and/or economic considerations, for example.

Figure 8:
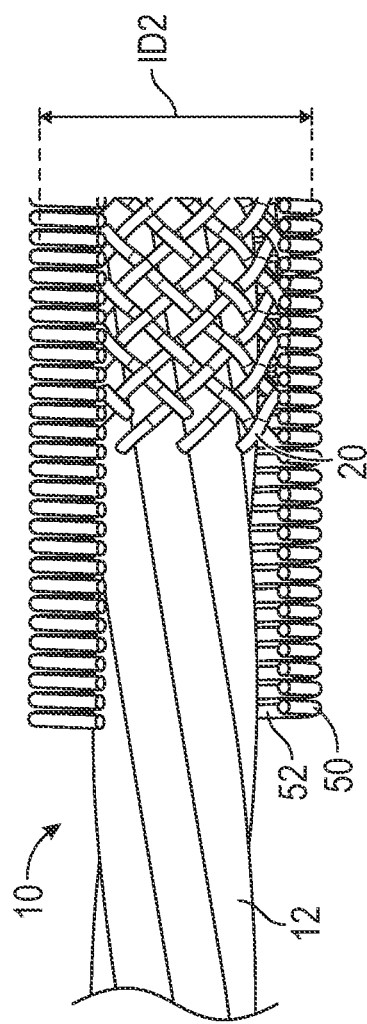
FIG. 8 illustrates a side elevation view of a portion of a rope connection system according to another embodiment.

Referring to FIG. 8, the system 10 may include an outer sleeve 50 configured to fit over top of the device 20 when the first rope 12 and the second rope 14 are positioned in the through hole 28. The outer sleeve 50 may be configured to increase friction between the device 20 and the first and second ropes 12, 14. The outer sleeve 50 may further be configured to decrease wear of the device 20, for example as the device 20 passes through sheaves and pulleys. The outer sleeve 50 includes an outer sleeve body 52 that, similar to the device body 22, is configured to be flexible such that a length of the outer sleeve 50, an inner dimension ID2 of the outer sleeve 50, or both are variable in response to a force applied to the outer sleeve 50. The outer sleeve body 52 may be configured such that in a relaxed state, with no outside force applied to the outer sleeve 50, the inner dimension ID2 is smaller than the inner dimension ID1. The outer sleeve body 52 may be configured such that the length of the outer sleeve 50 is greater than the length L1. Alternatively, the outer sleeve body 52 may be configured such that the length of the outer sleeve body 52 is either less than or equal to the length L1. According to one embodiment, the outer sleeve 50 is a shrink tube. According to another embodiment, the outer sleeve 50 is a helical wire, as shown in FIG. 5 with a partial cutout of the wire to provide visibility of the underlying elements.

Figure 9:
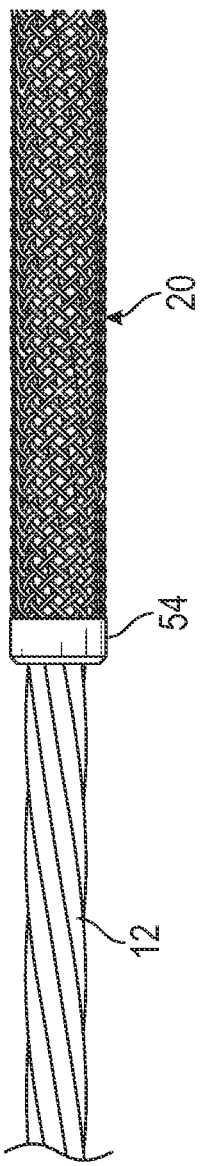
FIG. 9 illustrates a side elevation view of a portion of a rope connection system according to another embodiment.

Referring to FIG. 9, the device 20 may include a structure, such as a device end cap 54 attached to an end of the device body 22. The device end cap 54 may be configured to be connected to a respective one of the plurality of ropes after insertion of the respective one of the plurality of ropes into the through hole 28. Connection of the device end cap 54 to the respective rope may prevent accidental release of the respective rope from the device 20. The device end cap 54 may be configured to be crimped, adhered, or otherwise attached to the respective rope. The device 20 may include two device end caps 54, a first device end cap attached to the first end 24 and a second device end cap attached to the second end 26. The first device end cap may be configured to be connected to a first rope inserted into the through hole 28, and the second device end cap may be configured to be connected to a second rope inserted into the through hole 28.

Figure 10:
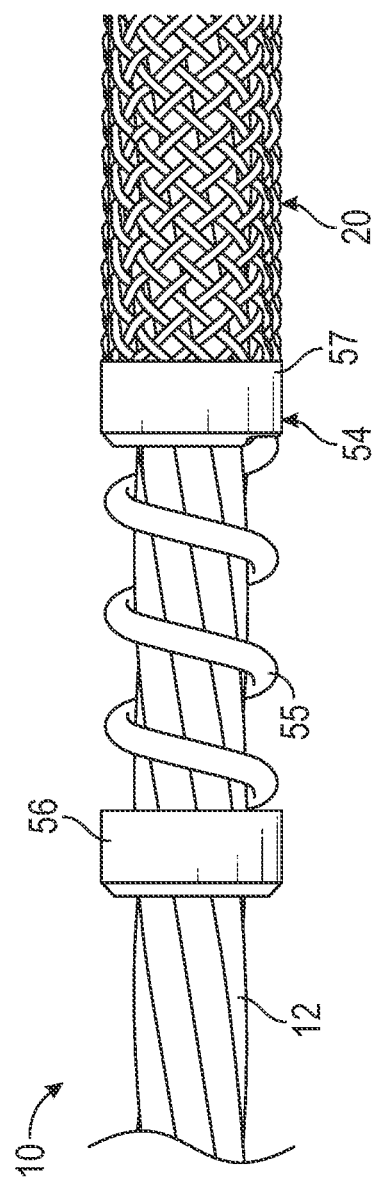
FIG. 10 illustrates a side elevation view of a portion of a rope connection system according to another embodiment.

Referring to FIG. 10, the device 20 may include a device end cap 54 having a biasing member 55, such as a spring. The biasing member 55 may be loaded with an initial force prior to connection of a second device end cap 54 to one of the plurality of ropes such that the spring is configured to maintain tension on the device body 22 and re-center the respective rope in the through hole 28 if relative slippage occurs.

As shown in the illustrated embodiment, the device end cap 54 can include a first member 56 configured to be fastened to the first rope 12 such that movement of the first member 56 relative to the first rope 12 is restricted, for example prevented without plastically deforming at least one of the first member 56 and the first rope 12. The device end cap 54 can further include a second member 57 coupled to the plurality of members 42. The device end cap 54 can include the biasing member 55 positioned between the first member 56 and the second member 57.

The device 20 can include two of the device end caps 54 with the first member 56 of one of the device end caps 54 configured to be fastened to the first rope 12, and the first member 56 of another of the device end caps 54 configured to be fastened to another rope of the system 10. The device 20 can be configured such that once both device end caps 54 are fastened, the biasing member 55 applies a force on the second member 57 biasing the second member 57 toward the first member 56 thereby increasing the length L1 of the device 20 and decreasing the inner diameter ID1 of the device 20. The decreased inner diameter ID1 can result in an increased force on the plurality of ropes within the through hole 28, thereby preventing removal of the plurality of ropes from the through hole 28.

Referring to FIGS. 5-10, the device 20 may define an assembled configuration and an unassembled configuration. In the unassembled configuration an entirety of the first rope 12 is positioned outside the through hole 28, an entirety of the second rope 14 is positioned outside the through hole 28, and the inner dimension ID1 is smaller than both the outer diameter OD1 of the first rope 12 and the outer diameter OD2 of the second rope 14. The device 20 defines an assembled configured in which a portion, for example the first end 13, of the first rope 12 is positioned in the through hole 28, a portion, for example the first end 15 of the second rope 14 is positioned in the through hole 28, and the inner dimension ID1 is greater than both the first outer diameter OD1 of the first rope 12 and the outer diameter OD2 of the second rope 14.

According to one embodiment, the device 20 is configured such that the device 20 will maintain the joining of the first rope 12 and the second rope 14 up to a maximum force. Maintaining the joining of the first rope 12 and the second rope 14 includes preventing plastic deformation of the device 20, movement of either or both of the first end 13 and the first end 15 from the through hole 28, or both. According to one embodiment, the device 20 may be configured such that the maximum force is about 75% of the maximum tensile strength of one of the first rope 12 and the second rope 14. According to one embodiment, the device 20 may be configured such that the maximum force is about 100% of the maximum tensile strength of one of the first rope 12 and the second rope 14.

According to one embodiment the device 20 the outer diameter OD3 of the device body 22 is between about 100% and 125% of the outer diameter OD1 of the first rope 12, and is between about 100% and 125% of the outer diameter OD2 of the second rope 14.

According to one embodiment, the system 10 may include friction enhancements such as an inner sleeve positioned in the through hole 28, for example against the inner surface 32, such that the inner sleeve is between the inner surface 32 and one or more of the ropes positioned in the through hole 28. The inner sleeve may include rubber, polymer, organic material, or any combination thereof. The device body 22 may include a high friction coating such as composite diamond coatings, electroless nickel silicon carbide, or other similar substances. The device body 22 may include a visual indicator showing the location of the center of the device body 22 between the first end 24 and the second end 26. The device body 22 may include an inner wall that extends from the inner surface 32 toward the device central axis 30, such that the inner wall is configured to provide a hard stop during the insertion of the rope into the through hole 28. The inner wall may be configured to block a portion, up to an entirety of the through hole 28 with respect to the longitudinal direction L.

In use, the system 10 is configured to join a first rope 12 to a second rope 14. A first end 13 of the first rope 12 is inserted into the through hole 28 and advanced until the first end 13 is positioned between the first end 24 and the second end 26 with respect to the longitudinal direction L, for example near a center of the device body 22. A first end 15 of the second rope 14 is inserted into the through hole 28 and advanced until the first end 15 is positioned between the first end 24 and the second end 26 with respect to the longitudinal direction L, for example near a center of the device body 22.

The first end 13 and the first end 15 may be abutting, or may face each other such that a gap is defined between them. According to one aspect of the disclosure, an entirety of the first rope 12 is offset from an entirety of the second rope 14 with respect to the longitudinal direction L. In other words, no portion of the first rope 12 overlaps with any portion of the second rope 14 with respect to the longitudinal direction L. The first end 13 and the first end 15 may be positioned within the through hole 28 such that the first rope axis 16 and the second rope axis 18 are aligned, or in other words collinear.

During insertion of the first rope 12, the second rope 14, or both a force may be applied to the device body 22 to increase the inner dimension ID from a first size to a second size. The first size may be smaller than the outer diameter of the first and second ropes OD1, OD2, and the second size may be larger than the outer diameters of the first and second ropes OD1, OD2. Once the first end 13 and the first end 15 are positioned inside the through hole 28 the force may be removed from the device body 22 allowing the inner dimension ID1 to reduce from the second size. The inner dimension ID may reduce to the first size, or may reduce until the inner dimension ID matches at least one of outer dimension OD1 of the first rope 12 and the outer dimension OD2 of the second rope 14.

Any force applied to either or both of the first rope 12 and the second rope 14 in a direction away from the other of the first rope 12 and the second rope 14 results in the length L1 of the device body 22 increasing and the inner diameter ID1 decreasing, thus increasing the friction force holding the first and second ropes 12, 14 in place within the through hole 28.

According to one aspect of the disclosure a kit is provided that includes a plurality of ropes and at least one of the devices 20 configured to join a first of the plurality of ropes to a second of the plurality of ropes.

Figure 11:
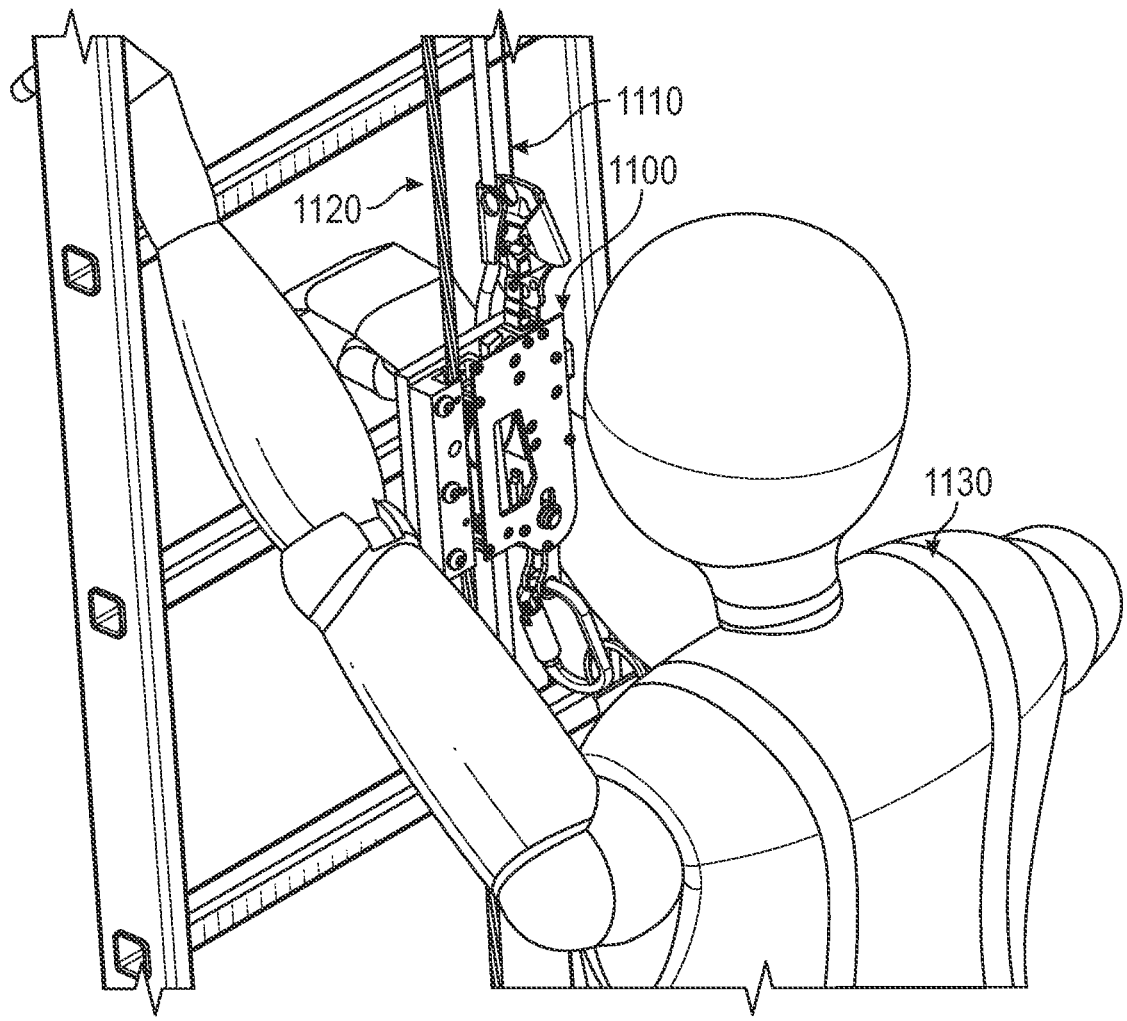
FIG. 11 illustrates an integrated fall arrest and climb assist controller attached to cables and a user in accordance with embodiments discussed herein.
Figure 12D:
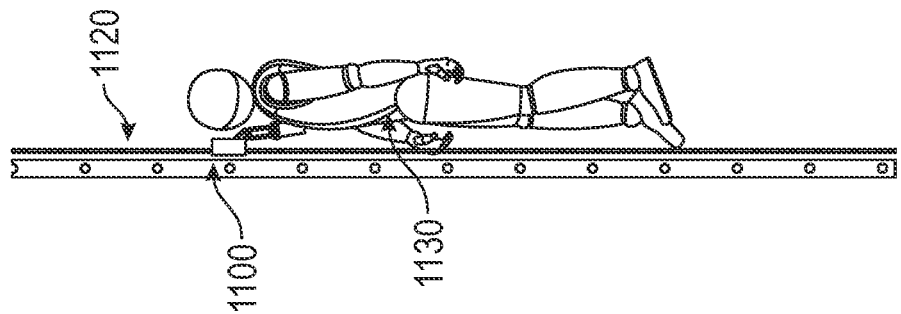
FIG. 12 illustrates differences in fall distances between a conventional fall arrest system and the integrated climb assist and fall arrest system in accordance with embodiments.
Figure 12C:
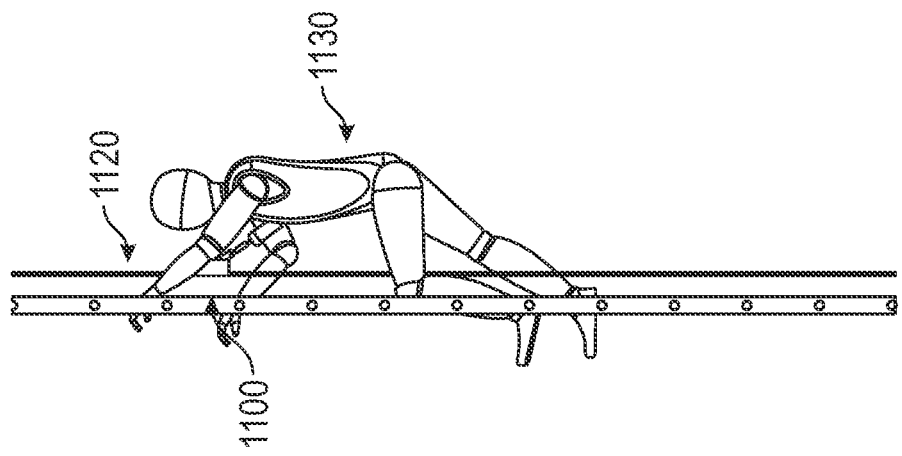
Figure 12B:
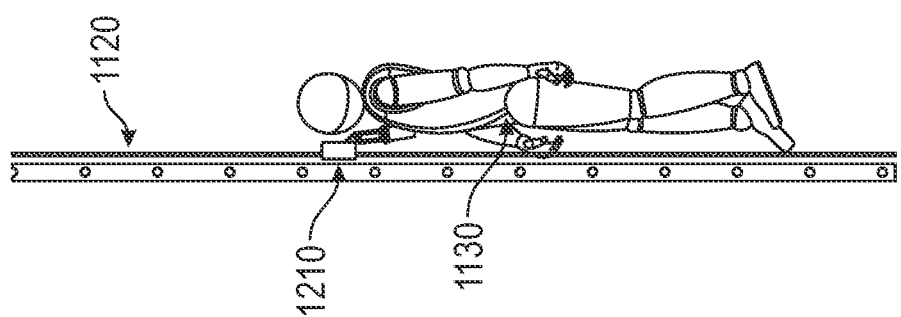
Figure 12A:
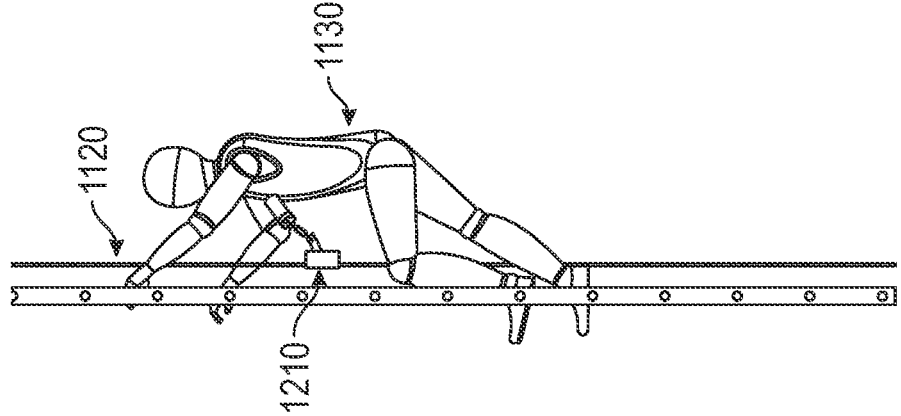

FIG. 11 illustrates an integrated fall arrest and climb assist controller 1100, which connects to both the climb assist belt 1110 and static fall arrest cable 1120. In embodiments, the integrated controller connects to a harness 1130 worn by a user, and the harness connection can be a single sternal D-ring. Accordingly, the integrated controller provides a braking mechanism when a fall is detected and transfers the upwards force from the climb assist cable to the user.

When the climb assist is activated, the integrated controller will provide tension on the user's harness. Thus in the event of a fall, the user's fall distance will be lessened. The device is also a fall arrest and must act as a fall arrest if not connected to the climb assist belt. In this case, if the user was not connected to the climb assist belt, the controller would be at the user's waist rather than the user's head and would act as any other fall arrestor distance-wise.

FIG. 12 demonstrates this concept, compared to conventional fall arrest systems, in which only the fall arrest cable 1120 is attached to fall arrest device 1210 connected to a user harness 1130. Again, the integrated design reduces the distance that a user travels during a fall, thus reducing the impact of the fall arrest. In conventional fall arrest systems, the fall arrest system is pulled upwards as the user climbs and remains below the point of attachment on the harness. Thus, during a fall, the climber will fall a combined distance of the initial vertical length above the fall arrest cable attachment, plus the length of cable to harness attachment, as indicated by Distance 1. In the integrated climb assist and fall arrest design, the integrated controller is continuously pulling the user upwards. Thus, the controller typically remains above the point of attachment on the harness. Consequently, during a fall, the climber will fall a significantly shorter distance, indicated by Distance 2, since the cable to harness length is already at a higher vertical point when the fall occurs. Thus, the integrated system can reduce impact and discomfort during a fall or descent. It will also be appreciated that the climb assist is a line of defense and when connected to the climb assist, if one were to fall, the fall would be limited in distance as described.

The integrated controller pretensions the climber connection to the climb assist cable and fall assist cable, thus providing fall arrest with significantly lower forces than traditional climbing ladder fall arrest systems. In addition, the embodiments discussed herein eliminates nuisance trips, from either system, and promotes safe climbing practices. From a manufacturing and mechanical perspective, the single controller eliminates excess materials, and improves ease of maintenance and use.

FIG. 13A illustrates the integrated controller's fall arrest operation, after an acceleration activation. This scenario occurs in the event of loss of climb assist support or in the event of a fall when the integrated controller is not connected to the climb assist mechanism. The integrated access controller can be separated into two mechanisms, the fall arrest mechanism and the climb assist mechanism. Under normal operation, the climb assist mechanism supports the fall arrest mechanism vertically. The fall arrest can move upward compared to the friction force that exists between the fall arrest housing and the fall arrest static member.

During ascent or descent 1310, the flywheel 1315 spins freely while in contact with the fall arrest cable 1317. In other words, as the integrated controller 1300 moves upwards relative to the fall arrest cable 1317 during the climber's ascent, the flywheel 1315 rotates counterclockwise.

FIGS. 13A-13C illustrate the integrated controller's fall arrest operation, after an acceleration activation. This scenario occurs in the event of loss of climb assist support or in the event of a fall when the integrated controller is not connected to the climb assist mechanism. The integrated access controller can be separated into two mechanisms, the fall arrest mechanism and the climb assist mechanism. Under normal operation, the climb assist mechanism supports the fall arrest mechanism vertically. The fall arrest can move upward compared to the friction force that exists between the fall arrest housing and the fall arrest static member.

As shown in FIG. 13A, during ascent or descent, the flywheel 1315 spins freely while in contact with the fall arrest cable 1317. In other words, as the integrated controller 1300 moves upwards relative to the fall arrest cable 1317 during the climber's ascent, the flywheel 1315 rotates counterclockwise.

As shown in FIG. 13B, during the initial moments of a free fall, the connection arm 1325, which is connected to the user harness, is pulled downward, activating lever 1327. The downward movement causes the flywheel 1315 to rotate in the opposite direction, i.e., clockwise, since the controller 1300 is moving downward relative to the cable 1317. The activated lever 1327 stops the flywheel from spinning freely and forces the flywheel to move upwards along the guided track 1335.

When the pawls engage the inner gear, the gear begins to climb up the track 1370, similar to the engagement with the guided track in FIG. 13A. As the flywheel 1355 reaches the top of the track 1370, the fly wheel becomes wedged against lever 1380 and the fall arrest cable 1317, causing downward motion to stop.

Figure 13F:
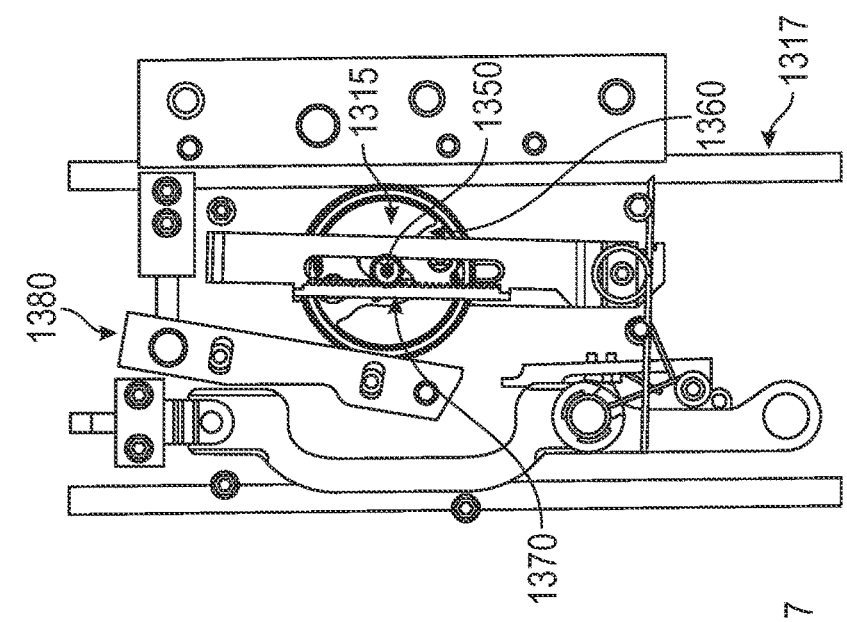
FIGS. 13D-13F illustrate an integrated controller's fall arrest operation in accordance with embodiments discussed herein in the event a velocity past threshold is detected.
Figure 13E:
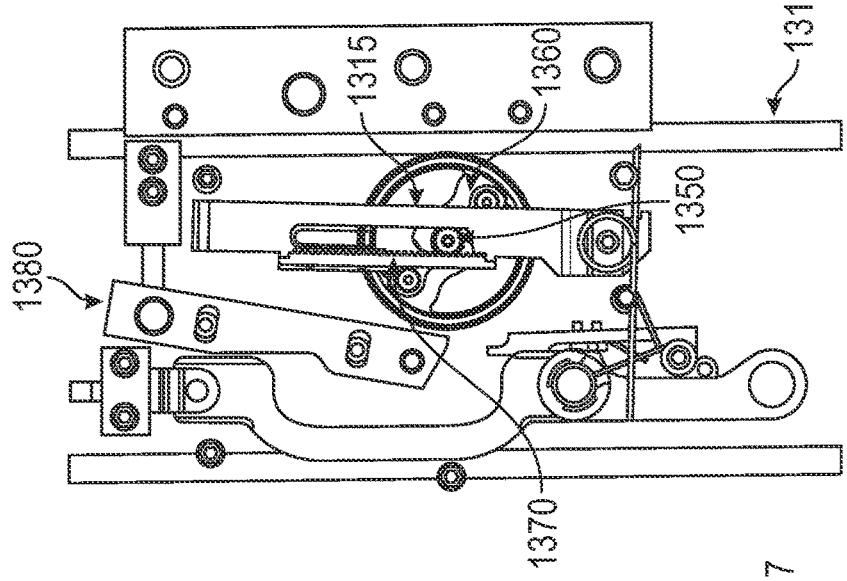
Figure 13D:
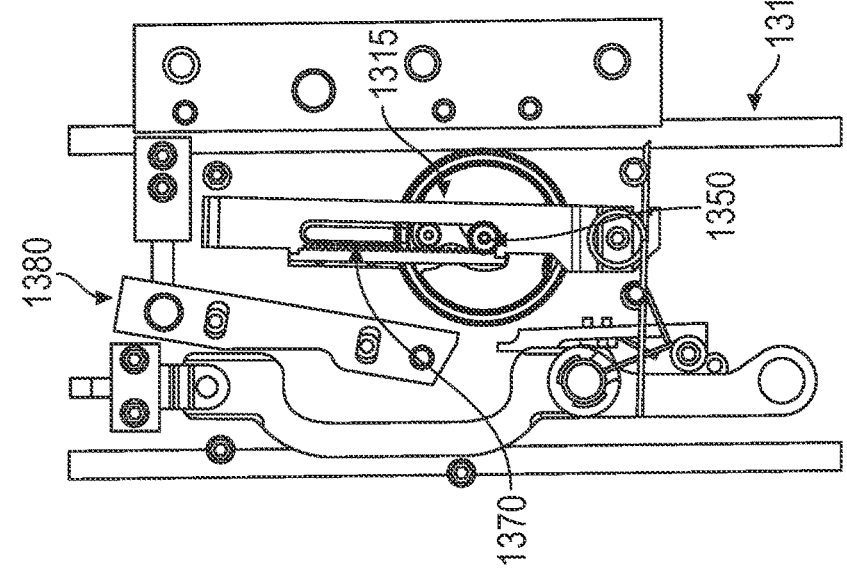
Figure 14B:
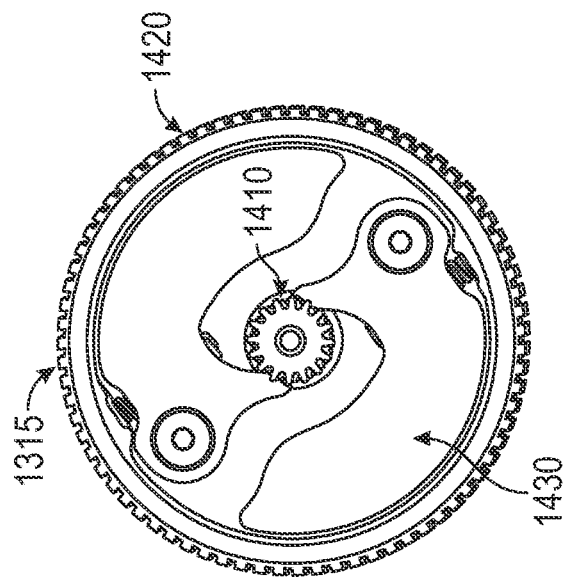
FIG. 14C illustrates a flywheel in accordance with embodiments discussed herein.
Figure 14C:
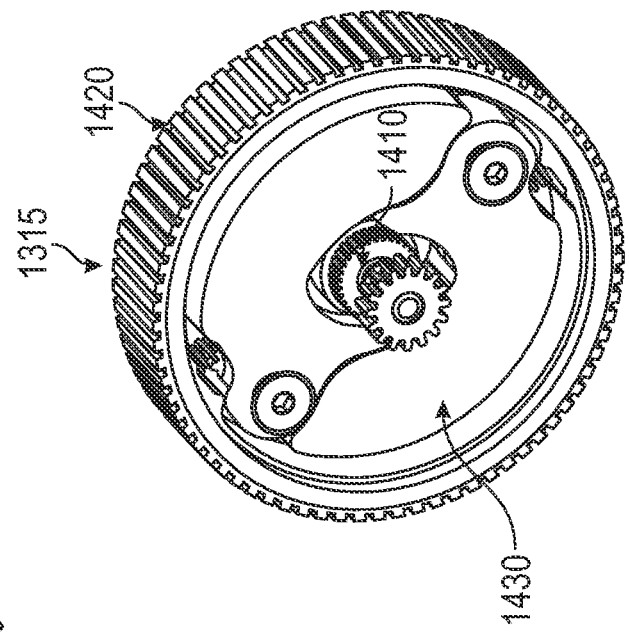
Figure 14A:
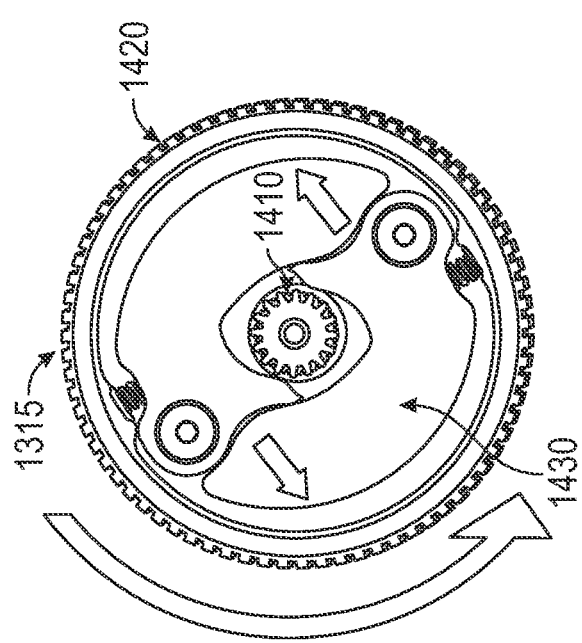

FIGS. 13D-13F illustrate the integrated controller's fall arrest operation, after a velocity activation. In these examples, during ascent or descent, an inner gear 1350 on the flywheel 1315 remains idle while the outer wheel spins. This occurs while the velocity of the flywheel relative to the cable is below a threshold velocity. When the threshold velocity is reached, the pawls 1360 of the flywheel engage with the inner gear 1350. (See also FIG. 14AC).

When the pawls engage the inner gear, the gear begins to climb up the track 1370, similar to the engagement with the guided track in FIG. 13A. As the flywheel 1315 reaches the top of the track 1370, the fly wheel becomes wedged against lever 1380 and the fall arrest cable 1317, causing downward motion to stop.

As discussed above, the integrated system has several mechanisms to identify when a descent occurs and is configured to both allow descent while stopping falls. Accordingly, the user's measured downward speed triggers one of several options.

In a first scenario, such as when a user is climbing down a ladder, the system can have a predetermined speed threshold, such as 3 feet/second, which cannot be exceeded without triggering a lock at the integrated controller device, and in some embodiments, requiring user input to both unlock and restart the downwards descent. Such thresholds can be selected and incorporated to encourage safe climbing behaviors.

In some embodiments, there may be two threshold speeds. The first threshold, e.g., exceeding 3 feet/second, can trigger a lock on the motor. In embodiments, the climb assist motor is not back-drivable, thus acting as a fall prevention device, as the climb assist belt can only move downward when allowed by the control system. When a second threshold is met, e.g., exceeding 4 feet/second, the fall arrest system engages. This can be the point at which the flywheel becomes locked and wedged within the integrated controller to prevent any downwards movement.

In another embodiment, there may only be one threshold speed. Additionally, the fall arrest engagement at the integrated controller can be triggered due to a sudden downward acceleration, i.e., meeting a threshold acceleration, which would most likely indicate a slip or sudden fall, rather than a controlled downwards descent.

In a second scenario, the integrated system is configured to allow downward descent. This configuration would essentially allow users to rappel downwards, as the system controls the downward speed, for example, at a maximum allowed speed of 3 feet per second. In this configuration, the system need not know the user's weight, as the downward speed is limited mechanically, through one or more fall arrest means discussed above. In embodiments, the user can make a selection to initiate either the complete fall arrest and locking mechanism or allow controlled downward descent up to a threshold speed. In embodiments, the user may be capable of selecting the downward speed through an input device, such as a level, knob, or button.

It will be appreciated that the various features and processes described above may be used independently of one another or may be combined in various ways. All possible combinations and sub-combinations are intended to fall within the scope of this disclosure.

Figure 15:
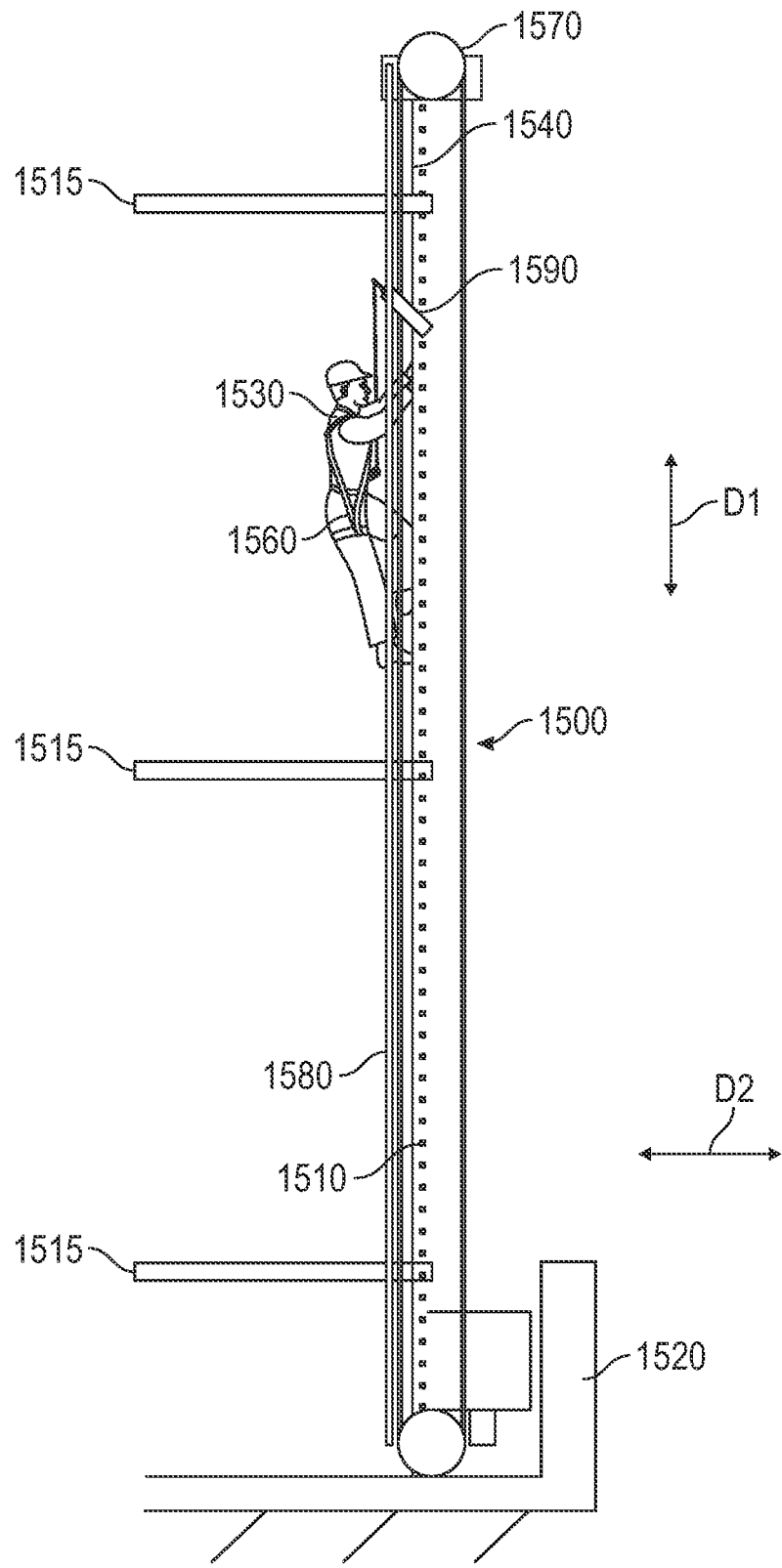
FIG. 15 illustrates a side view of a schematic climb assist and fall arrest system according to one aspect of the disclosure.

FIG. 15 shows a schematic climb assist and fall arrest system and side view of a climber on a ladder during ascent or descent on a tower. For example, a service personnel climbing a ladder during a maintenance routine of a wind generating tower. Said climber is attached by a rope grab to an assist rope which is preferably in the form of a continuous loop of wire rope formed in accordance with the disclosure provided herein, extending between sheave at the specified upper level of assist and sheave at the specified lower level of assist. Other higher or lower limits may equally be specified. Of course, the disclosed system is also useful for assisting a climber in ascending and descending in other structures such as signal tower, bridges, dams, and skyscrapers. In the climb assist system, a wire rope forms a continuous loop fitted about a traction sheave and one or more anchor points along the path of the climber.

The wire rope may be designed and selected in accordance with one or more embodiments described herein, and with respect to FIGS. 4-10. The wire rope features a joint section comprising a diameter that is limited to a certain percentage greater than a diameter of the wire rope. In an embodiment, the joint section diameter is approximately 80% greater than the wire rope's diameter. By limiting the diameter, the continuous rope can fit more securely in the groove of the traction sheave and maintain traction on a single grooved sheave and reduce fatigue damage to the joint. In various embodiments, the joint section can be easily formed prior to or after incorporating the wire rope around the traction sheave and one or more anchors. In other embodiments, wire rope can be quickly and easily joined to form the continuous loop in a matter of minutes (e.g., under 5 minutes).

The climb assist system provides cable tensioning, using the sheave and drive system, to provide an upward force upon the wire rope as a user traverses a vertical path. The drive system's motor provides the necessary force to rotate of the wire rope about the traction sheave. The frictional force between the continuous wire rope and traction sheave drives movement of the rope in a continuous motion along the climbing path, dynamically assisting the climber with a predetermined amount of force.

The traction sheave can comprise any of a number of designs and configurations, such as a V-grooved or U-grooved sheave and include one or more pressure rollers to achieve the desired features and purposes discussed herein. The traction sheave can be designed to specifically fit the size and type of wire rope and be easily accessible for quick and efficient installation of the continuous wire rope 120 around the one or more anchors and groove of the sheave.

Accordingly, the climb assist and fall arrest system 1500 may include a structure 1510 configured to be positioned on a base surface 1520 and then climbed up to increase elevation of the user 1530 relative to the base surface 1520 and climbed down to decrease elevation of the user 1530 elevation relative to the base surface 1520. According to one aspect of the disclosure, the structure 1510 may include a ladder, and the base surface 1520 may include a portion of the ground, a wall, a floor, or other surface suitable to support the structure 1510.

The climb assist and fall arrest system 1500 may further include a static guide member 1540, e.g., cable, rail, etc., supported by, for example, the structure 1510. One or more attachments 1515, such as an anchor, can secure the structure 1510 to a wall or other supporting device for stabilization. The static guide member 1540 is configured to receive a fall arrest device 1590 such that the fall arrest device 1590 is both movable with respect to the static guide member 1540 along a first direction D1 and restricted from moving with respect to the static guide member 1540 along a second direction D2. As shown in the illustrated embodiment, the first direction D1 may include the both the directions of ascent and descent of the structure 1510 and the second direction D2 may be perpendicular to the first direction D1. According to one aspect of the disclosure, the static guide member 1540 may include a cable, a rail, a channel, or any combination thereof.

In embodiments, one or more anchors can be placed at various locations along the ladder, for example, at the top and bottom of the ladder, to guide the continuous wire rope along the climbing path, and back down towards the traction sheave and drive system components. In embodiments, the anchors are pulleys with diameters up to 25 times the diameter of the wire ropes. In various embodiments, the one or more anchors reduce or eliminate any contact between the continuous wire rope and the ladder, e.g., rungs of the ladder, so that the continuous wire rope neither damages nor is damaged by the ladder. In some applications where the ladder or climbing device is not completely vertical, the one or more anchors are particularly helpful in reducing contact and reducing and/or eliminating frictional damage due to repeated contact as the rope is continuously driven. In another embodiment the anchors are guides or wear surfaces made of low friction and wear materials that smoothly guide the wire rope.

The climb assist and fall arrest system 1500 may further include a harness 1560 configured to be secured to, for example worn by, the user 1530. The harness 1560 is further configured to be attached to the climb assist and fall arrest device 1590 such that movement of the user 1530 along the first direction D1, results in movement of the climb assist and fall arrest device 1590 along the static guide member 1540 along the first direction D1. The wire rope can be attached at one or more points to the harness or other device worn by the user to provide assistance during a climb. In an embodiment, attachment to the wire rope is through a lanyard connected between a commercially available body harness worn by the climber and rope grab.

The climb assist and fall arrest system 1500 may further include a support assembly 1570 configured to support at least a portion of the weight of the user 1530 during movement of the user 1530 in the first direction D1 along the structure 1510. The support assembly 1570 may include a belt, cable, rope, or other climb assist member 1580. According to one embodiment, the climb assist member 1580 forms a continuous loop. According to another embodiment, the climb assist member 1580 includes a first end that is configured to attach to the user 1530, for example via the harness 1560, and a second end configured to attach to a motor, one or more pulleys, counterweights, or any combination thereof. The support assembly 1570 may further include an attachment grab, for example a cam or a lever, configured to attach to the climb assist member 1580.

The climb assist and fall arrest system 1500 may further include a harness attachment 1590 configured to couple the user 1530 to the structure 1510 and assist ascent and descent of the structure 1510 by the user 1530. The climb assist and fall arrest device 1590 is configured both to support at least a portion of the weight of the user 1530 during ascent and descent of the structure 1510, and to arrest movement of the user 1530 relative to the structure 1510 when the user 1530 is falling.

In embodiments, a load sensor in communication with the motor analyzes the tension between the climber harness and the moving climb assist belt and adjusts the tension on the rope to provide a predetermined upwards force. The predetermined upwards force may be, for example, a percentage of the climber's weight. In this manner, a continuous, consistent upwards force will be provided throughout the climber's ascent and descent. As such, the climb assist system can adapt to varying climbing speeds. If for example, a user increases speed during an ascent, the load sensor would initially detect a decrease in tension in between the climber and the climb assist belt, and consequently adjust the motor to increase speed to reach the predetermined upwards force.

Figure 16:
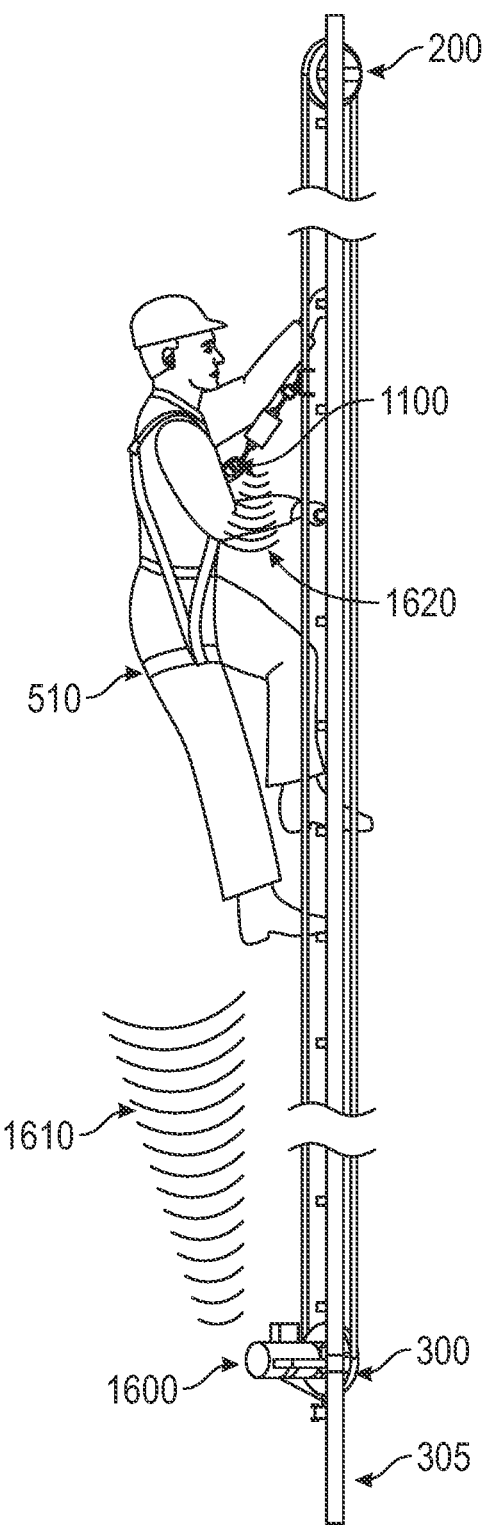
FIG. 16 illustrates signal communication facilitated by a control unit in accordance with embodiments discussed herein.

FIG. 16 illustrates signal communication facilitated by a control unit 1600, in which transmitted and received signals 1610, 1620 between the integrated controller 1100 and control unit 1600 are indicative of one or more user inputs and operations of the system. In embodiments, control unit 1600 can be placed at the base of the ladder 305, attached to one or more components of the lower mount 300. The control unit can also be communicatively coupled to the integrated controller 1100, which is attached to the user's harness, and the climb assist and fall arrest cables. In embodiments, signals 1610 transmitted to the control unit 1600 can contain information about one or more metrics including speed, acceleration, forces on each of the cables, and system operation information. In embodiments, the control unit further comprises a computing device having a memory and processor.

The following examples illustrate system performance and operation in accordance with various embodiments. It will be appreciated that the operation and functions of integrated climb assist and fall arrest systems are not limited to the examples and embodiments herein.

In a first example, the integrated system is installed on a ladder, similar to FIG. 16. The upper mount 200 and lower mount 300 support both the movable climb assist belt and static fall arrest cable, and both the belt and cable are secured to the integrated controller 1100, which is connected to the user's harness. The user is able to select a level of assistance, for example 50-90% of bodyweight up to 120 feet per minute, for his/her ascent up or descent down the ladder. The user can enter information such as body weight and make selections regarding climb assistance through any of a plurality of input means. For example, the control unit 1600 may operate in conjunction with a remote device on which the user can make selections and enter information. The remote device can be integrated with the integrated controller 1100. Additionally, or alternatively, selections can be made on a computing device, a base unit, or the control unit 1600.

In embodiments, the user settings can be changed throughout the climb, e.g., increasing/decreasing assistance during the climb. The system can continuously measure the climber's body weight, based in part on the load forces measured at the integrated controller. Accordingly, the system can respond to changes in the climber's speed, e.g., providing additional assistance when the climber is slowing down, and decreasing the assistance level when the climber is ascending or descending quickly. In other embodiments, user settings and/or climb assist level can be entered prior to the climb, and remain constant throughout the system's operation.

In various embodiments, the integrated controller can comprise a rechargeable battery and have a visual charge level indicator. The integrated controller 1100 can also be in signal communication with the control unit 1600 and/or comprise a computing device having a processor and memory, which can assist in executing one or more functions discussed herein. Optional features for the integrated controller 1100 include one or more of a radiofrequency identification (RFID) tag, climb data recording, one or more sensors to detect presence of the fall arrest cable and/or the climb assist belt, fall detection and alert notifications, and required regular testing, e.g., daily inspections, of the fall arrest function before use.

In various embodiments, a control unit can measure one or more metrics of the integrated fall arrest and climb assist system. In embodiments, the control unit can be at least one or a computing device and a remote device that be communicatively coupled to one or more aspects of the climb assist and fall arrest system, and compile information including, but not limited to storing user setting inputs (e.g., weight, speed, etc.), and force (load) measurements between the climber and the integrated controller.

The control unit can additionally receive inputs such as the flywheel's rotational speed, which is indicative of the climber's vertical speed, accelerometer information, and motor current and speed. In embodiments, the control unit continuously seeks targeted assistance levels, and interprets and responds to climber behavior, such as speed and other forces indicative of climber movements.

Referring to FIGS. 15-17, according to one aspect of the disclosure, the climb assist and fall arrest device 1590 includes a sensor 1780 configured to detect a first parameter of the climb assist and fall arrest device 1590. The first parameter may include speed, acceleration, or both. The climb assist and fall arrest device 1590 further includes a brake mechanism 8, and the climb assist and fall arrest device 1590 defines a disengaged configuration and an engaged configuration. In the disengaged configuration the climb assist and fall arrest device 1590 is freely movable relative to the static guide member 1540 along the first direction D1. In the engaged configuration the climb assist and fall arrest device 1590 is not freely movable relative to the static guide member 1540 along the first direction D1. According to one embodiment, in the engaged configuration relative movement of the climb assist and fall arrest device 1590 and the static guide member 1540 is completely prevented. According to another embodiment, in the engaged configuration relative movement of the climb assist and fall arrest device 1590 and the static guide member 1540 is restricted to a speed slow enough to prevent major injury to the user 1530 upon reaching the base surface 1520. According to another embodiment, in the engaged configuration relative movement of the climb assist and fall arrest device 1590 and the static guide member 1540 is restricted to an acceleration below that of a free fall.

The climb assist and fall arrest device 1590 includes fall arrest components that are configured to arrest a fall of the user 1530 in communication with climb assist components of the climb assist and fall arrest device 1590 that are configured to support at least a portion of the weight of the user 1530. The communication of the fall arrest components and the climb assist components may include physical connection, electronic connection, or both. Physical connection between the fall arrest components and the climb assist components may include, but is not limited to, mechanical, magnetic, pneumatic, etc. Electronic connection between the fall arrest components and the climb assist components may include a system capable of passing information from one of the fall arrest components and the climb assist components to the other of the fall arrest components and the climb assist components such as but not limited to wired, wireless, fiber optic, or any combination thereof. The electronic connection can include one-way or two-way communication between the fall arrest components and the climb assist components. The information passed between the fall arrest components and the climb assist components may include one or more of the status, velocity, acceleration, load, position, orientation, of components of the climb assist and fall arrest system 1500. The climb assist and fall arrest system 1500 may include or may be configured to be connected to a supervisory control and data acquisition (SCADA) system configured to record, report, or both data and events associated with the climb assist and fall arrest system 1500.

The climb assist and fall arrest device 1590 may be configured to transition from one of the engaged configuration and the disengaged configuration to the other of the engaged configuration and the disengaged configuration based on the information passed between the fall arrest components and the climb assist components. For example, the status of one or more of the climb assist components may be changed, for example the motor may be toggled from on to off, in response to the climb assist and fall arrest device 1590 transitioning from the disengaged configuration to the engaged configuration, or vice versa.

A climb assist and fall arrest device 1590 including fall arrest components connected to climb assist components as described above may provide benefits including: controlled interaction between the fall arrest components and the climb assist components; access of the fall arrest components to additional data including, but not limited to, acceleration, speed, jerk, climb assist force, user input, or any combination thereof, and the capability for the fall arrest components to use any of that data as a trigger to transition the climb assist and fall arrest device 1590 from the disengaged configuration to the engaged configuration; access of the climb assist components to additional data including whether the climb assist and fall arrest device 1590 is in the engaged configuration, and if the climb assist and fall arrest device 1590 is in the engaged configuration to turn off one or more of the climb assist components; the climb assist and fall arrest device 1590 may include a lockout preventing operation of the climb assist components prior to connection of the fall arrest components to the static guide member 1540, thus reducing the risk of the user 1530 forgetting to attach the fall arrest components to the static guide member 1540; data collection including, but not limited to, distance traveled, on time for various components of the climb assist and fall arrest device 1590, number of times the climb assist and fall arrest device 1590 transitions from the disengaged configuration to the engaged configuration, etc., improving efficiencies related to service and maintenance of the climb assist and fall arrest system 1500; internal storage for data collected by the climb assist and fall arrest system 1500, generated by the climb assist and fall arrest system 1500, or both; capability to report when the climb assist and fall arrest device 1590 transitions from the disengaged configuration to the engaged configuration alerting others that the user 1530 may be in need of assistance; reduced fall distance prior to transition of the climb assist and fall arrest device 1590 from the disengaged configuration to the engaged configuration; or any combination thereof.

Some known fall arrest devices require a user to fall between about 795 to about 1000 mm. This fall distance is a result of the known fall arrest device hanging from a harness a certain distance. In the event of a fall, the member connecting the fall arrest device to a static guide member on the structure will go taut prior to the fall arrest device engaging with the static guide member and arresting the fall. According to one aspect of the disclosure, the climb assist components of the climb assist and fall arrest device 1590 are configured to keep the member connecting the climb assist and fall arrest device 1590 to the climb assist and fall arrest device 1590 taut, thereby minimizing fall distance prior to transitioning the climb assist and fall arrest device 1590 from the disengaged configuration to the engaged configuration.

According to one embodiment, the climb assist and fall arrest device 1590 is configured such that the user 1530 falls less than about 12 inches prior to the climb assist and fall arrest device 1590 transitioning from the disengaged configuration to the engaged configuration, thereby stopping movement of the user 1530 relative to the structure 1795 in the first direction D1. According to another embodiment, the climb assist and fall arrest device 1590 is configured such that the user 1530 falls less than about 6 inches prior to the climb assist and fall arrest device 1590 transitioning from the disengaged configuration to the engaged configuration, thereby stopping movement of the user 1530 relative to the structure 1795 in the first direction D1. According to another embodiment, the climb assist and fall arrest device 1590 is configured such that the user 1530 falls between about 1 inch and about 3 inches prior to the climb assist and fall arrest device 1590 transitioning from the disengaged configuration to the engaged configuration, thereby stopping movement of the user 1530 relative to the structure 1795 in the first direction D1.

Referring again to FIGS. 17A-C, according to one aspect of the disclosure, the climb assist components and the fall arrest components may be mechanically connected. For example, the climb assist and fall arrest device 1590 may include a yoke connecting or tying the climb assist components and the fall arrest components to one another. Additionally, or alternatively, the climb assist components and the fall arrest components may be mounted to or housed at least partially within a common structure, such as a housing 1740 that is configured to be attached to the harness 1560.

As shown in the illustrated embodiment, the climb assist and fall arrest device 1590, may include a climb assist connector, which connects the climb assist and fall arrest device 1590 to the climb assist member 1580, in addition to the static member. The climb assist member 1580 may include metal, polymer, rope, or any combination thereof. The climb assist connector 1700 may include a camming member configured to engage the climb assist member 1580 with the climb assist and fall arrest device 1590, for example with the housing 1740.

As shown in the illustrated embodiment, the climb assist and fall arrest device 1590, may include a fall arrester 1710. The fall arrester is configured to engage the static guide member 1540. According to one embodiment, the fall arrester 1710 includes a wheel that upon reaching a designated speed of rotation, locks, engages, or both with the brake mechanism 1760 to halt downward motion of the climb assist and fall arrest device 1590, and the attached user 1530. The fall arrester 1710 may be configured to engage with the brake mechanism in response to only movement of the climb assist and fall arrest device 1590 toward the base surface 1520.

As shown in the illustrated embodiment, the climb assist and fall arrest device 1590, may include a load sensor 1720 configured to measure a load applied by the support assembly 1570, for example the motor, to the climber or climber harness to which the climb assist and fall arrest device 1590. The load sensor 1720 may be positioned within the housing 1740, or may be separate from the housing 1740.

As shown in the illustrated embodiment, the climb assist and fall arrest device 1590, may include a processor and sending unit 1730. The processor and sending unit 1730 may include a printed circuit board assembly that converts sensor data, for example from the load sensor 1720, into a digital signal and then sends the digital signal, for example wirelessly, to the support assembly.

The housing 1740 of the climb assist and fall arrest device 1590 may include metallic material, polymeric material, or both. The housing 1740 may be rigid cast, formed, forged, machined, injection molded, 3D printed, any combination thereof, or the housing 1740 may be made through other known manufacturing methods.

As shown in the illustrated embodiment, the climb assist and fall arrest device 1590, may include a cable presence sensor 1780. The cable presence sensor 1780 is configured to detect the presence of the climb assist and fall arrest device 1590, for example a fall arrest cable, coupled or configured to be coupled to the static guide member 1540. The cable presence sensor 1780 may include an optical, resistance, inductive, laser, capacitive, eddy current, ultrasonic, or similar sensor configured to detect the presence of climb assist and fall arrest device 1590.

As shown in the illustrated embodiment, the climb assist and fall arrest device 1590, may include a speed sensor 1750 configured to directly, indirectly, or both measure velocity of the static guide member 1540 relative to the climb assist and fall arrest device 1590. The brake mechanism 1760 of the climb assist and fall arrest device 1590 may include an electro-mechanical brake configured to be engaged by the processor and sending unit 1730. The brake mechanism 1760 may include a solenoid configured to transition the climb assist and fall arrest device 1590 from the disengaged configuration to the engaged configuration. The climb assist and fall arrest device 1590 may further include a brake engagement sensor 1770 configured to detect whether the climb assist and fall arrest device 1590 is in the engaged configuration or the disengaged configuration.

As shown in the illustrated embodiment, the climb assist and fall arrest device 1590, for example the sensor 1750, may include an accelerometer configured to measure acceleration of the climb assist and fall arrest device 1590. The housing 1740 may include a cover 1790, for example a removable cover 1790 that encloses other components of the climb assist and fall arrest device 1590 within the housing 1740. The cover 1790 may include the same materials as the housing 1740 or different materials than the housing 1740.

As shown in the illustrated embodiment, the climb assist and fall arrest device 1590, may include one or more input mechanisms 1795. The one or more input mechanism 1795, for example buttons, are configured to receive input from the user 1530, for example the user 1530 pushing a button with a finger, to adjust performance of the climb assist and fall arrest device 1590. For example, the one or more input mechanisms 1795 may include up and down buttons configured to be pushed by the user 1530 to indicate whether the user 1530 is going up the structure 1510 or down the structure 1510, and thereby engaging the motor to move in the appropriate direction. The one or more input mechanisms 1795 may include a stop button configured to send a signal to the motor to stop moving when the stop button is pressed.

As shown in the illustrated embodiment, the climb assist and fall arrest device 1590, may include a speaker 1797. The speaker 1797 is configured to emit an audible signal, for example, an alarm to indicate that the climb assist and fall arrest device 1590 has transitioned from the disengaged configuration to the engaged configuration, and to alert others that the user 1530 may require assistance.

The climb assist and fall arrest device 1590 may include one or more lockouts configured to prevent accidental disconnection of the climb assist and fall arrest device 1590 from the static guide member 1540. According to one embodiment, the lockout may be configured to require two distinct actions to remove the climb assist and fall arrest device 1590 from engagement with the static guide member 1540. The climb assist and fall arrest device 1590 may include mechanical lockouts, electrical lockouts, or both that prevent incorrect connection such as connecting a fall arrest cable to the climb assist belt or connecting the climb assist and fall arrest device 1590 upside down. The climb assist and fall arrest device 1590 may be configured such that in the event of a failure of any electronic or electrical components of the climb assist and fall arrest device 1590, or if the climb assist components are not engaged with any support assembly 1570, or if any of the climb assist components are damaged, the climb assist and fall arrest device 1590 continues to operate as a fall arrester, or is still capable of transitioning from the disengaged configuration to the engaged configuration without any additional input or information from the climb assist components.

According to one aspect of the disclosure, when the climb assist and fall arrest device 1590 is not providing any climb assistance, or is not supporting any of the weight of the user 1530, the climb assist and fall arrest device 1590 may be configured to provide enough friction to hold itself up when the user 1530 is climbing down toward the base surface 1520, thereby decreasing fall distance needed for the climb assist and fall arrest device 1590 to transition from the disengaged configuration to the engaged configuration. The climb assist and fall arrest device 1590 may be configured to exert a first friction force while the user 1530 is ascending the structure 1510, and a second friction force different from the first friction force when the user 1530 is descending the structure 1510.

According to one aspect of the disclosure, the climb assist and fall arrest device 1590 may be configured such that connection of the climb assist and fall arrest device 1590 to the static guide member 1540 without a successful test of the climb assist and fall arrest device 1590 being performed is prevented. The climb assist and fall arrest device 1590 may further be configured such that in the event of a failed test the climb assist and fall arrest device 1590 includes a lockout configured to be overridden using a mechanical intervention, such as removal of the cover 1790 and turning a knob or lever, or using a key.

The brake mechanism 1760 may include a small wheel that drives the fall arrest wheel and is positioned at least partially outside the housing 1740. The small wheel may be configured to be pressed against the static guide member 1580 and act as a safety mechanism as the user 1530 moves. For example, the rotational speed of the small wheel is indicative of the user speed, and can be mechanically or electrically calibrated and configured to engage the brake mechanism 1760 when a threshold speed is reached. Thus, the brake mechanism 1760 can help ensure that the user is moving at a safe speed.

The climb assist and fall arrest device 1590 may include a test mode, where the brake mechanism is purposely engaged (for example by dropping the climb assist and fall arrest device 1590 in freefall) and at least one of the velocity and acceleration are measured to verify the climb assist and fall arrest device 1590 is functioning properly. In an embodiment, the climb assist and fall arrest device 1590 can be configured to prevent usage of the climb assist and fall arrest device 1590 without a fall arrest test or calibration being performed. The climb assist and fall arrest device 1590 may include an indicator light that indicates whether a fall arrest test has been performed. The climb assist and fall arrest device 1590 may be configured such that the brake mechanism 1760 is configured to be manually activated by the user 1530, for example by squeezing an actuator of the climb assist and fall arrest device 1590. The climb assist and fall arrest device 1590 may include a prominent emergency stop button that engages the brake mechanism 1760, transitioning the climb assist and fall arrest device 1590 from the disengaged configuration to the engaged configuration, when pressed. The climb assist and fall arrest device 1590 may include a rigid or semi-rigid member that connects the climb assist and fall arrest device 1590 to the user 1530, for example via the harness 1560. The rigid or semi-rigid member may be configured to retain the climb assist and fall arrest device 1590 closer to at least one of the user 1530 and the static guide member 1540, thereby decreasing fall distance in the event of a fall, even if the support assembly 1570 has not yet applied a load to the climb assist and fall arrest device 1590.

The climb assist and fall arrest device 1590 may be configured to lock out, or prevent any support of the weight of the user 1530 when the climb assist and fall arrest device 1590 is not connected to the static guide member 1540, when the climb assist and fall arrest device 1590 is installed upside down, when the climb assist and fall arrest device 1590 is in the engaged configuration, or any combination thereof. The climb assist and fall arrest device 1590 may be configured to measure load supplied by the support assembly 1570 to the user 1530, and transmit that data to components of the support assembly 1570. The climb assist and fall arrest device 1590 may be configured to transmit an independent identification, for example to the support assembly 1570.

The climb assist and fall arrest device 1590 may be configured to measure the velocity of the user 1530 via a sensor measuring the speed of the static guide member 1540 relative to the climb assist and fall arrest device 1590. The climb assist and fall arrest device 1590 is configured to transmit that data to components of the support assembly 1570, such as the motor. The climb assist and fall arrest device 1590 may include a battery, and the climb assist and fall arrest device 1590 may be configured to charge the battery by rotation of components of the climb assist and fall arrest device 1590, for example the wheel of the brake mechanism 1760.

The climb assist and fall arrest device 1590 may be configured such that upon the speed of the user 1530 exceeding a set threshold, the climb assist and fall arrest device 1590 sends a stop signal to the motor, thereby preventing further movement of the climber, until the climber provides further manual inputs. The climb assist and fall arrest device 1590 may further be configured such that if a stop signal has been sent to the motor, and the climb assist and fall arrest device 1590 has not stopped moving for a selected amount of time, the brake mechanism 1760 is engaged electronically, transitioning the climb assist and fall arrest device 1590 from the disengaged configuration to the engaged configuration. The climb assist and fall arrest device 1590 may be configured such that if the speed of the user 1530 exceeds a selected maximum value, the brake mechanism 1760 is engaged electronically, transitioning the climb assist and fall arrest device 1590 from the disengaged configuration to the engaged configuration. The climb assist and fall arrest device 1590 may be configured such that if the accelerometer senses the user 1530 is falling, the device sends a stop signal to the motor.

The climb assist and fall arrest device 1590 may include a mechanical lock configured to prevent overload of the load sensor 1720, due to excessive motion of the climb assist and fall arrest device 1590. The mechanical lock could be configured to allow a certain amount of displacement, then lock to prevent excessive displacement and sensor damage, but in the case of a hard fall, break away and deform in a way to absorb excess energy preventing injury to the user 1530.

Figure 18:
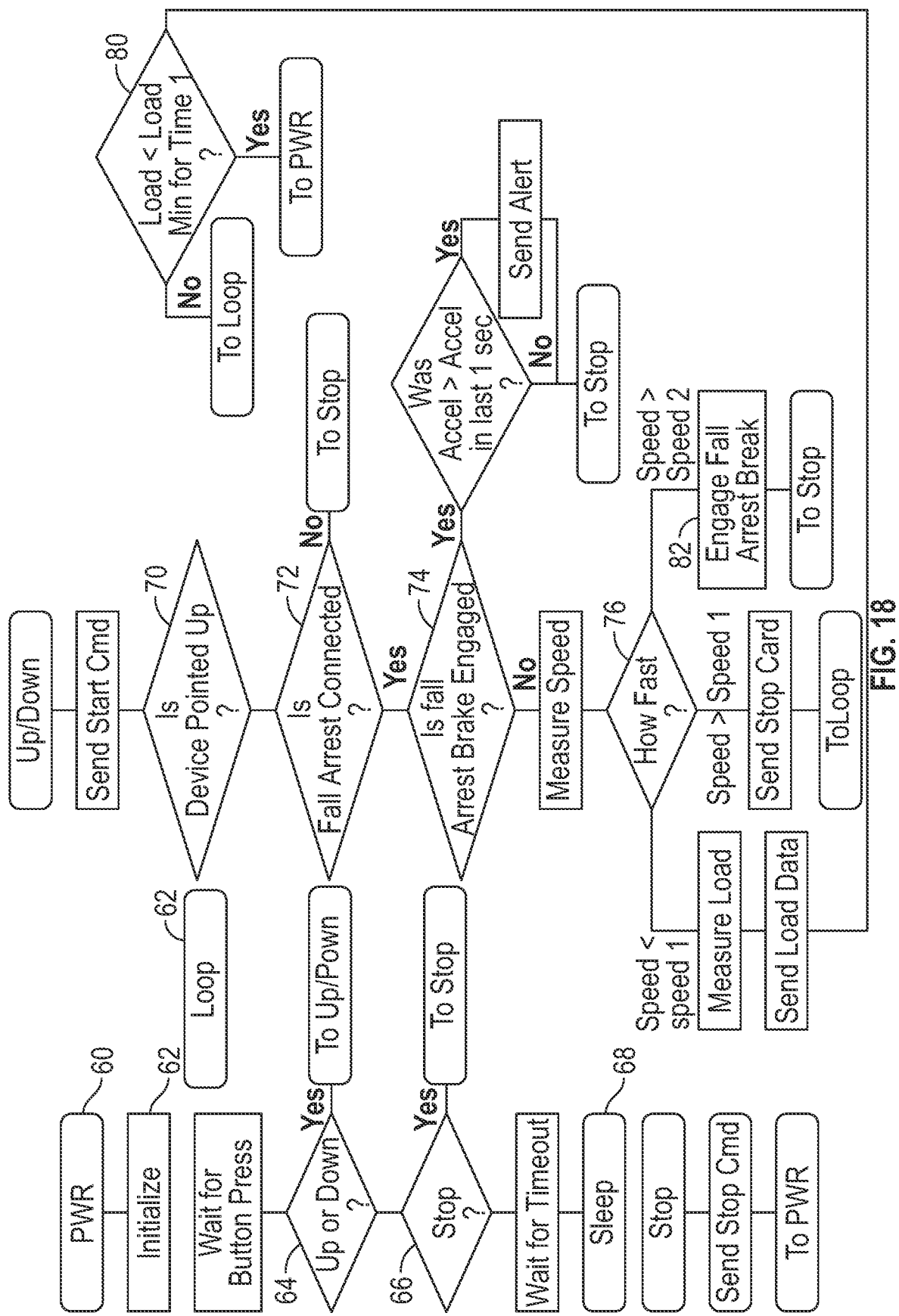
FIG. 18 illustrates a logic flow diagram of the climb assist and fall arrest device, according to one aspect of the disclosure.

Referring to FIG. 18, when the climb assist and fall arrest device 1590 is activated by the user 1530, the climb assist and fall arrest device 1590 is powered on at 60. The system initializes at 62 and awaits input from the user 1530 such as a button press. Input to an Up or Down interface 64 sends a signal to the motor to support a least a portion of the weight of the user 1530 and provide assistance in movement of the user 1530 either up the structure 1510 or down the structure 1510 as indicated by the user 1530. Input to a Stop interface 66 sends a signal to the motor to stop moving. Input to the Stop interface may further send a signal to power down the climb assist and fall arrest device 1590. If the climb assist and fall arrest device 1590 receives no input for a predetermined amount of time the system will enter a low-power sleep mode 68.

Input to the Up or Down interface 64 sends a start command to the motor. The climb assist and fall arrest device 1590 detects either the climb assist and fall arrest device 1590 being oriented upside down at 70, or detecting that the climb assist and fall arrest device 1590 is not connected to the static guide member 1540 at 72, or detecting that the climb assist and fall arrest device 1590 is in the engaged configuration at 74 sends a signal to the motor to stop moving.

The system measures the speed of the climb assist and fall arrest device 1590 at 76. If the measured speed is less than a first selected speed the load is measured at 78. The load data may be sent or otherwise made available for further analysis. If the measured load is less than a first selected load at 80 for a minimum Time 1, than the system continues to run and provide support to the climber by returning to operation 70. If the measured load is greater than the first selected load at 80 for a Time 1, then operation may transition to operation 60.

If the measured speed is greater than the first selected speed, a signal is sent to stop the descent of the climber, such as causing the motor to stop. If the measured speed is greater than a second selected speed, then the climb assist and fall arrest device 1590 is transitioned to the engage the fall arrest brake at 82. For example, a signal can be sent to activate the fall arrest brake or causing the motor to stop or slow down.

Figure 19:
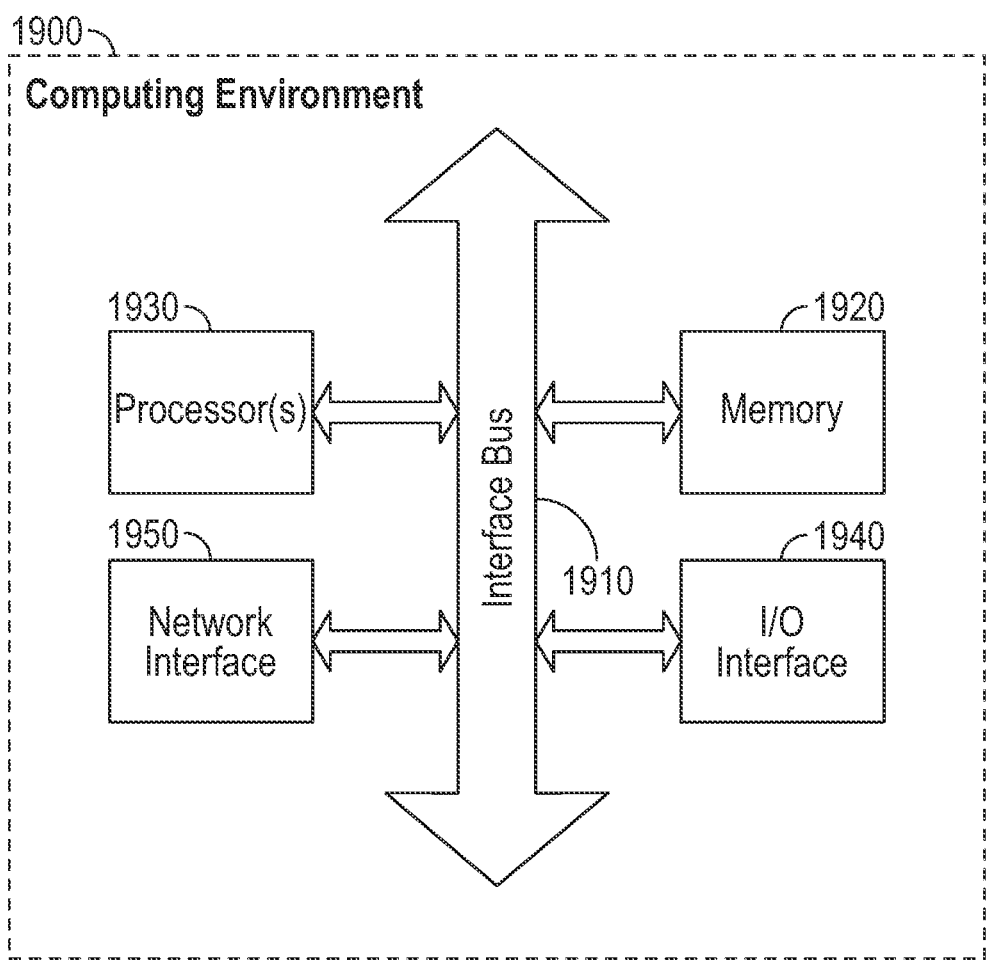
FIG. 19 depicts an example general purpose computing environment in which embodiments of the invention can be implemented.

Having briefly described an overview of embodiments of the invention, an example of a computing environment suitable for implementing aspects of the embodiments is described below. Referring to the figures generally and initially to FIG. 19 in particular, an exemplary computing environment in which embodiments of the present invention is depicted and generally referenced as computing environment 1900. As utilized herein, the phrase "computing system" generally refers to a dedicated computing device with processing power and storage memory, which supports operating software that underlies the execution of software, applications, and computer programs thereon. As shown by FIG. 19, computing environment 1900 includes bus 1910 that directly or indirectly couples the following components: memory 1920, one or more processors 1930, I/O interface 1940, and network interface 1950. Bus 1910 is configured to communicate, transmit, and transfer data, controls, and commands between the various components of computing environment 1900.

Computing environment 1900 typically includes a variety of computer-readable media. Computer-readable media can be any available media that is accessible by computing environment 1900 and includes both volatile and nonvolatile media, removable and nonremovable media. Computer-readable media may comprise both computer storage media and communication media. Computer storage media does not comprise, and in fact explicitly excludes, signals per se.

Computer storage media includes volatile and nonvolatile, removable and nonremovable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing environment 1900.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 1920 includes computer-storage media in the form of volatile and/or nonvolatile memory. The memory may be removable, non-removable, or a combination thereof. Memory 1920 may be implemented using hardware devices such as solid-state memory, hard drives, optical-disc drives, and the like. Computing environment 1900 also includes one or more processors 1930 that read data from various entities such as memory 1920, I/O interface 1940, and network interface 1950.

I/O interface 1940 enables computing environment 1900 to communicate with different input devices and output devices. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 1910 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 1940 is configured to coordinate I/O traffic between memory 1920, the one or more processors 1930, network interface 1950, and any combination of input devices and/or output devices.

Network interface 1950 enables computing environment 1900 to exchange data with other computing devices via any suitable network. In a networked environment, program modules depicted relative to computing environment 1900, or portions thereof, may be stored in a remote memory storage device accessible via network interface 1950. It will be appreciated that the network connections shown are exemplary and other means of establishing a communications link between the computers may be used.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

It is understood that the term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s). Additionally, computer executable instructions embodying aspects of the invention may be stored in ROM EEPROM, hard disk (not shown), RAM, removable magnetic disk, optical disk, and/or a cache of processing unit. A number of program modules may be stored on the hard disk, magnetic disk, optical disk, ROM, EEPROM or RAM, including an operating system, one or more application programs, other program modules and program data.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A device for joining a first rope to a second rope, comprising:
    a first end cap that extends along a central axis, the first end cap including a first opening on a first side of the first end cap defining a first anulus to receive a first end of the first rope therein, the first end cap having a first outer diameter, a first body diameter, and a first anulus diameter, wherein the first anulus diameter is greater than the first body diameter and less than the first outer diameter, and
    a second end cap that extends along a central axis, the second end cap including a second opening on a first side of the second end cap defining a second anulus to receive a first end of the second rope therein, the second anulus having a second body diameter, the second opening also having a second outer diameter, the second end cap further comprising a third opening on a second side of the second end cap opposite to the second opening, the third opening defining a cavity configured to receive a link, the cavity having a second anulus diameter, wherein the second anulus diameter is a greatest internal diameter of the cavity, wherein the second anulus diameter is greater than the second body diameter and less than the second outer diameter, and wherein the first outer diameter is the same as the second outer diameter,
    the link having a diameter spaced away from an end of the link received by the cavity, the link linking the first end cap to the second end cap,
    wherein the first outer diameter of the first end cap and the second outer diameter of the second end cap are substantially the same as a diameter of the first rope and the second rope.

2. The device of claim 1 wherein the first rope and second rope are joined by the device to form a continuous loop.

3. The device of claim 2 wherein the continuous loop retains approximately 75% of the tensile strength or more of the first rope or the second rope.

4. The device of claim 2 wherein the continuous loop has a Minimum Breaking Strength (MBS) of 5,500 lbs.

5. The device of claim 1 wherein an outer diameter is substantially a width of a sheave.

6. The device of claim 1 wherein a connecting area of a cable reduces at least one of frictional damage or wear to the rope traveling around a sheave.

7. The device of claim 1 wherein each of the first rope and the second rope comprise a polymer extrusion with a 10 mm overall diameter and both a core and a protective covering.

8. The device of claim 1 wherein the first end cap further comprises a fourth opening on a second side of the first end cap opposite to the first opening, the fourth opening defining a second cavity configured to receive the link.

9. The device of claim 8 wherein at least one end of the link comprises a truncated cone, a sphere, or a cylinder.

10. The device of claim 1 wherein the link comprises a swage section.

11. A climbing system comprising:
    a ladder having at least one sheave coupled thereto; and
    at least one rope wherein the ends of the rope are joined together with a device for joining a first rope to a second rope, wherein the device comprises a first end cap and a second end cap;
    the first end cap having a first opening defining a first anulus to receive a first end of the first rope therein, the first end cap having a first outer diameter, a first body diameter, and a first anulus diameter, wherein the first anulus diameter is greater than the first body diameter and less than the first outer diameter;

the second end cap including a second opening on a first side of the second end cap defining a second anulus to receive a first end of the second rope, the second anulus having a second body diameter, the second opening also having a second outer diameter, the second end cap further comprising a third opening on a second side of the second end cap opposite to the second opening, the third opening defining a cavity configured to receive a link, the cavity having a second anulus diameter, wherein the second anulus diameter is a greatest internal diameter of the cavity, wherein the second anulus diameter is greater than the second body diameter and less than the second outer diameter, and wherein the first outer diameter is the same as the second outer diameter; and the rope forms a continuous loop around the at least one sheave.

12. The climbing system of claim 11 further comprising at least a second sheave, the second sheave coupled to a motor, wherein the motor provides a rotational force to the second sheave to drive the continuous loop around the second sheave such that the device passes over the second sheave.

* * * * *